(12) United States Patent
Dockter et al.

(10) Patent No.: US 12,430,237 B2
(45) Date of Patent: Sep. 30, 2025

(54) REGIONAL CAPABILITY AWARE PROXY TESTING

(71) Applicant: Oracle International Corporation, Redwood Shores, CA (US)

(72) Inventors: Caleb Dockter, Seattle, WA (US); Erik Joseph Miller, Seattle, WA (US); Eric Tyler Barsalou, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 6 days.

(21) Appl. No.: 18/164,116

(22) Filed: Feb. 3, 2023

(65) Prior Publication Data

US 2023/0251956 A1    Aug. 10, 2023

Related U.S. Application Data

(60) Provisional application No. 63/314,776, filed on Feb. 28, 2022, provisional application No. 63/312,814, filed on Feb. 22, 2022, provisional application No. 63/308,003, filed on Feb. 8, 2022.

(51) Int. Cl.
    *G06F 15/177*    (2006.01)
    *G06F 11/3668*   (2025.01)
    *G06F 11/3698*   (2025.01)
    *H04L 67/06*     (2022.01)

(52) U.S. Cl.
    CPC ...... *G06F 11/3698* (2025.01); *G06F 11/3688* (2013.01); *H04L 67/06* (2013.01)

(58) Field of Classification Search
    CPC ... G06F 11/3664; G06F 11/3688; H04L 67/06
    USPC ........................................... 709/220
    See application file for complete search history.

(56) References Cited

U.S. PATENT DOCUMENTS

| | | | |
|---|---|---|---|
| 8,458,808 B2* | 6/2013 | Hill | G06Q 30/04 726/28 |
| 8,671,385 B2* | 3/2014 | Byrd | G06F 21/604 717/106 |
| 8,677,308 B2* | 3/2014 | Hopkins | G06F 8/30 717/106 |

(Continued)

OTHER PUBLICATIONS

PCT/US2023/062019, "International Search Report and Written Opinion", May 8, 2023, 11 pages.

(Continued)

*Primary Examiner* — Alicia Baturay
(74) *Attorney, Agent, or Firm* — Kilpatrick Townsend & Stockton LLP

(57) ABSTRACT

A test environment is provided for testing of a flock configuration. A configuration file of a service is parsed to identify one or more capabilities for executing a release of the configuration file of the service. The one or more capabilities correspond to operations performed with respect to one or more resource types. A capability-aware-proxy server included in the test environment is configured based on the one or more capabilities identified from the configuration file of the service. The release of the configuration file of the service is executed in the test environment in accordance with the configured capability aware-proxy server. The capability aware-proxy server generates a response message corresponding to an execution result of the release of the configuration file of the service.

19 Claims, 11 Drawing Sheets

(56) References Cited

U.S. PATENT DOCUMENTS

| | | | | |
|---|---|---|---|---|
| 8,707,276 | B2* | 4/2014 | Hill | G06F 8/70 717/125 |
| 8,832,858 | B2* | 9/2014 | Hill | G06F 21/31 726/28 |
| 9,032,204 | B2* | 5/2015 | Byrd | H04L 9/3268 705/76 |
| 9,069,599 | B2* | 6/2015 | Martinez | H04L 12/66 |
| 9,083,534 | B2* | 7/2015 | Kirk | G06F 21/10 |
| 10,250,452 | B2* | 4/2019 | Lucas | H04L 41/0869 |
| 10,447,811 | B2* | 10/2019 | Keller | H04L 61/4511 |
| 10,873,510 | B2* | 12/2020 | Lucas | H04L 41/145 |
| 11,074,165 | B2* | 7/2021 | Khakare | G06F 11/3684 |
| 11,153,224 | B2* | 10/2021 | Halimi | H04L 67/306 |
| 11,321,746 | B2* | 5/2022 | Zheng | H04L 67/02 |
| 11,593,084 | B2* | 2/2023 | Dinh | G06F 8/65 |
| 11,625,319 | B2* | 4/2023 | Balasubramanian | G06F 11/3476 717/124 |
| 11,625,506 | B1* | 4/2023 | Smith | H05K 5/0247 726/34 |
| 11,627,123 | B2* | 4/2023 | Stayskal | H04L 63/0442 726/7 |
| 11,736,579 | B1* | 8/2023 | Miller | G06F 9/5072 709/226 |
| 11,818,113 | B2* | 11/2023 | Stayskal | H04L 63/08 |
| 12,008,604 | B2* | 6/2024 | Zheng | G06Q 30/0255 |
| 12,135,639 | B2* | 11/2024 | Balasubramanian | G06F 11/3684 |
| 12,189,514 | B2* | 1/2025 | Mohan | G06F 11/3692 |
| 2013/0283238 | A1* | 10/2013 | Levi | G06F 11/3696 717/124 |
| 2017/0171034 | A1* | 6/2017 | Lucas | H04L 41/22 |
| 2017/0228227 | A1 | 8/2017 | Winterfeldt et al. | |
| 2019/0288956 | A1* | 9/2019 | Pulier | G06F 9/5072 |
| 2021/0184985 | A1* | 6/2021 | Pulier | H04L 63/0272 |
| 2021/0223923 | A1* | 7/2021 | Carre | G06F 9/44505 |
| 2022/0103593 | A1* | 3/2022 | Singh | H04L 63/0245 |
| 2023/0251851 | A1* | 8/2023 | Carre | G06F 9/451 717/120 |
| 2023/0251852 | A1* | 8/2023 | Miller | G06F 8/60 717/122 |
| 2023/0251870 | A1* | 8/2023 | Miller | G06F 8/60 718/104 |
| 2023/0251871 | A1* | 8/2023 | Miller | G06F 9/45558 713/2 |
| 2023/0251872 | A1* | 8/2023 | Dockter | G06F 8/433 713/2 |
| 2023/0251873 | A1* | 8/2023 | Carre | G06F 9/5077 718/104 |
| 2023/0251876 | A1* | 8/2023 | Mysore Jagadeesh | G06F 9/4401 713/2 |
| 2023/0251888 | A1* | 8/2023 | Belleau | G06F 9/45558 718/1 |
| 2023/0251909 | A1* | 8/2023 | Csar | G06F 9/5072 709/223 |
| 2023/0251921 | A1* | 8/2023 | Mysore Jagadeesh | G06F 11/0703 714/39 |
| 2023/0254287 | A1* | 8/2023 | Belleau | H04L 63/029 726/15 |
| 2023/0273816 | A1* | 8/2023 | Dockter | G06F 9/5038 718/104 |
| 2023/0305858 | A1* | 9/2023 | Miller | G06F 9/5038 |
| 2024/0080242 | A1* | 3/2024 | Lee | H04L 47/803 |
| 2024/0080277 | A1* | 3/2024 | Lee | H04L 67/60 |

OTHER PUBLICATIONS

International Application No. PCT/US2023/062019, International Preliminary Report on Patentability mailed on Aug. 22, 2024, 8 pages.

* cited by examiner

560

561
2022-05-19 T21:19:43 GET localhost /capabilities/worker failed with status 404 : { 565
2022-05-19 T21:19:43 "code" : "NotAuthorizedOrNotFound",
2022-05-19 T21:19:43 "message" : "No matches found for capability worker, or you are not authorized to access it" }
2022-05-19 T21:20:40 Error: Deployment ended in unsuccessful status: FAILED}
562

570

2022-05-19 T21:20:40 on modules/deployments/ in resource "odo_deployment" "regional_capabilities":
2022-05-19 T21:20:40: resource "odo_deployment" "regional_capabilities" {
2022-05-19 T21:20:50 Regional apply failed

FIG. 5B

REGIONAL CAPABILITY AWARE PROXY TESTING

CROSS-REFERENCES TO RELATED APPLICATIONS

This non-provisional application claims priority to U.S. Provisional Patent Application No. 63/308,003, filed on Feb. 8, 2022, entitled "Techniques for Bootstrapping a Region Build,", U.S. Provisional Patent Application No. 63/312,814, filed on Feb. 22, 2022, entitled "Techniques for Implementing Virtual Data Centers," and U.S. Provisional Patent Application No. 63/314,776, filed on Feb. 28, 2022, entitled "Regional Capability Aware Proxy Testing," the disclosures of each of which are herein incorporated by reference in their entirety for all purposes.

BACKGROUND

Today, cloud infrastructure services utilize many individual services to build a data center (e.g., to bootstrap various resources in a data center of a particular geographic region). In some examples, a region is a logical abstraction corresponding to a localized geographical area in which one or more data centers are (or are to be) located. Building a data center may include provisioning and configuring infrastructure resources and deploying code to those resources (e.g., for a variety of services). The operations for building a data center may be collectively referred to as performing a "region build".

Service teams participating in a region building process face a difficult scenario related to testing individual resources that are to be deployed in the region. Specifically, service teams are posed with the question of whether their service(s) work in a partially built region. Most services must be able to handle some services not being available during region build, in order to gracefully build the region. A common difficulty encountered by the service teams is that such environments are short-lived and not reproducible. As such, the service teams get one shot per region build to test their processes. Moreover, service teams that participate in the region build process desire to test their resources as if releasing to a region under-build. In other words, the service teams desire to perform testing their resources in an on-demand fashion, without having to wait for other services to successfully deploy. Embodiments discussed herein address these and other problems both, collectively as well as individually.

SUMMARY

The present disclosure relates to providing a test environment to simulate testing of flock configuration. Specifically, the present disclosure provides for a framework that provisions testing of flock configurations (for a region under built) in a seamless and time-efficient manner.

One aspect of the present disclosure provides for a method comprising: parsing a configuration file of a service to identify one or more capabilities for executing a release of the configuration file of the service, wherein the one or more capabilities correspond to operations performed with respect to one or more resource types; providing a test environment for executing the release of the configuration file of the service; configuring a capability-aware-proxy server included in the test environment based on the one or more capabilities identified from the configuration file of the service; executing, in the test environment, the release of the configuration file of the service in accordance with the capability-aware-proxy server that is configured with the one or more capabilities; and generating a response message corresponding to an execution result of the release of the configuration file of the service.

Another embodiment is directed to a cloud-computing system comprising one or more processors and instructions that, when executed by the one or more processors, cause an orchestration service of the cloud-computing system to perform the method(s) disclosed herein.

Still another embodiment is directed to a non-transitory computer-readable medium storing computer-executable instructions that, when executed by one or more processors of a cloud-computing system, cause an orchestration service of the cloud-computing system to perform the method(s) disclosed herein.

BRIEF DESCRIPTION OF THE DRAWINGS

Features, embodiments, and advantages of the present disclosure are better understood when the following Detailed Description is read with reference to the accompanying drawings.

To easily identify the discussion of any particular element or act, the most significant digit or digits in a reference number refer to the figure number in which that element is first introduced.

DETAILED DESCRIPTION

Figure 1:
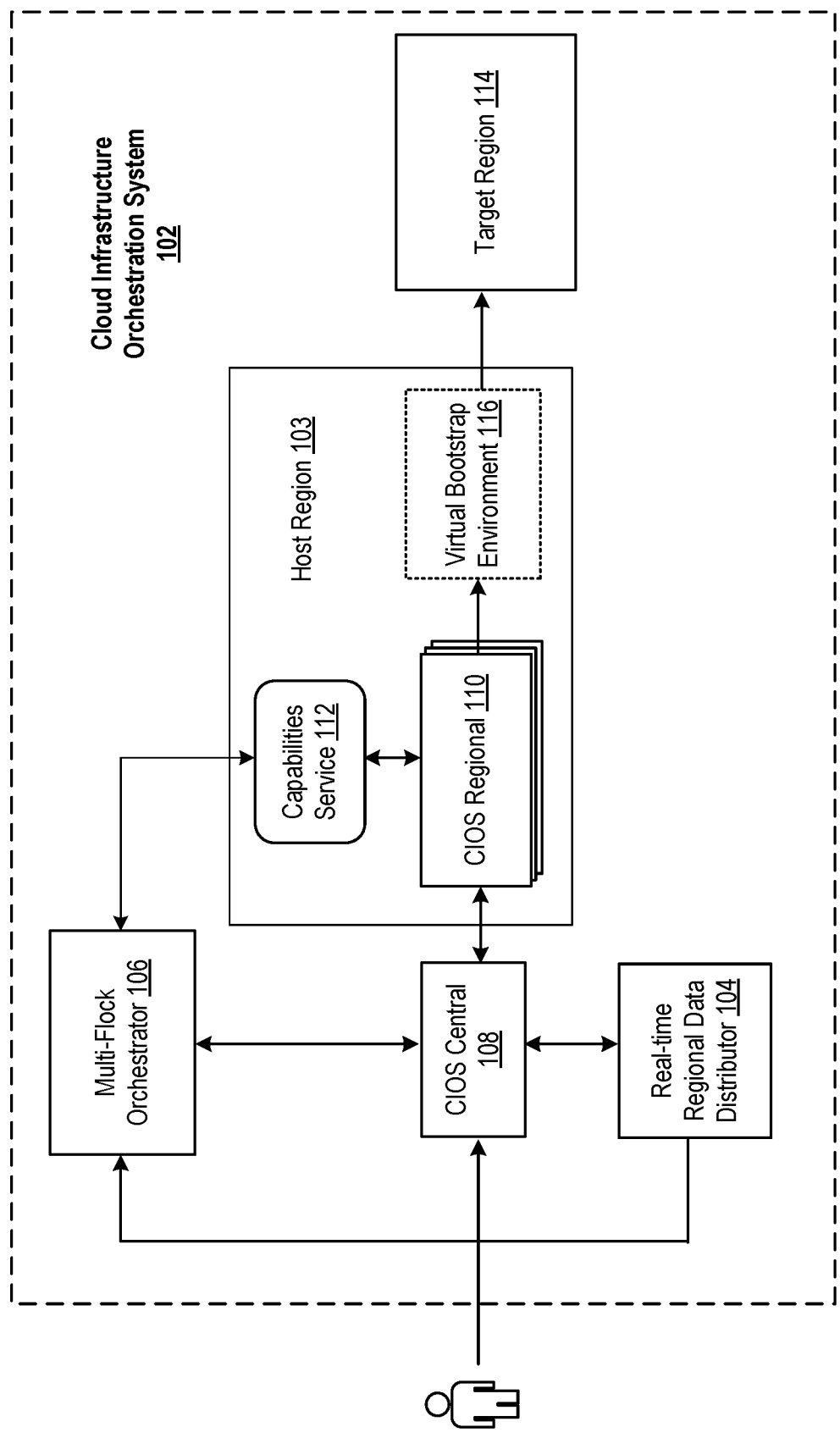
FIG. 1 is a block diagram of an environment in which a Cloud Infrastructure Orchestration Service (CIOS) may operate to dynamically provide bootstrap services in a region, according to at least one embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Example Automated Data Center Build (Region Build) Infrastructure

The adoption of cloud services has seen a rapid uptick in recent times. Various types of cloud services are now provided by various different cloud service providers (CSPs). The term cloud service is generally used to refer to a service or functionality that is made available by a CSP to users or customers on demand (e.g., via a subscription model) using systems and infrastructure (cloud infrastructure) provided by the CSP. Typically, the servers and systems that make up the CSP's infrastructure, and which are used to provide a cloud service to a customer, are separate from the customer's own on-premises servers and systems. Customers can thus avail themselves of cloud services provided by the CSP without having to purchase separate hardware and software resources for the services. Cloud services are designed to provide a subscribing customer easy, scalable, and on-demand access to applications and computing resources without the customer having to invest in procuring the infrastructure that is used for providing the services or functions. Various different types or models of cloud services may be offered such as Software-as-a-Service (SaaS), Platform-as-a-Service (PaaS), Infrastructure-as-a-Service (IaaS), and others. A customer can subscribe to one or more cloud services provided by a CSP. The customer can be any entity such as an individual, an organization, an enterprise, and the like.

As indicated above, a CSP is responsible for providing the infrastructure and resources that are used for providing cloud services to subscribing customers. The resources provided by the CSP can include both hardware and software resources. These resources can include, for example, compute resources (e.g., virtual machines, containers, applications, processors), memory resources (e.g., databases, data stores), networking resources (e.g., routers, host machines, load balancers), identity, and other resources. In certain implementations, the resources provided by a CSP for providing a set of cloud services CSP are organized into data centers. A data center may be configured to provide a particular set of cloud services. The CSP is responsible for equipping the data center with infrastructure and resources that are used to provide that particular set of cloud services. A CSP may build one or more data centers.

Data centers provided by a CSP may be hosted in different regions. A region is a localized geographic area and may be identified by a region name. Regions are generally independent of each other and can be separated by vast distances, such as across countries or even continents. Regions are grouped into realms. Examples of regions for a CSP may include US West, US East, Australia East, Australia Southeast, and the like.

A region can include one or more data centers, where the data centers are located within a certain geographic area corresponding to the region. As an example, the data centers in a region may be located in a city within that region. For example, for a particular CSP, data centers in the US West region may be located in San Jose, California; data centers in the US East region may be located in Ashburn, Virginia; data centers in the Australia East region may be located in Sydney, Australia; data centers in the Australia Southeast region may be located in Melbourne, Australia; and the like.

Data centers within a region may be organized into one or more availability domains, which are used for high availability and disaster recovery purposes. An availability domain can include one or more data centers within a region. Availability domains within a region are isolated from each other, fault tolerant, and are architected in such a way that data centers in multiple availability domains are very unlikely to fail simultaneously. For example, the availability domains within a region may be structured in a manner such that a failure at one availability domain within the region is unlikely to impact the availability of data centers in other availability domains within the same region.

When a customer or subscriber subscribes to or signs up for one or more services provided by a CSP, the CSP creates a tenancy for the customer. The tenancy is like an account that is created for the customer. In certain implementations, a tenancy for a customer exists in a single realm and can access all regions that belong to that realm. The customer's users can then access the services subscribed to by the customer under this tenancy.

As indicated above, a CSP builds or deploys data centers to provide cloud services to its customers. As a CSP's customer base grows, the CSP typically builds new data centers in new regions or increases the capacity of existing data centers to service the customers' growing demands and to better serve the customers. Preferably, a data center is built in close geographical proximity to the location of customers serviced by that data center. Geographical proximity between a data center and customers serviced by that data center lends to more efficient use of resources and faster and more reliable services being provided to the customers. Accordingly, a CSP typically builds new data centers in new regions in geographical areas that are geographically proximal to the customers serviced by the data centers. For example, for a growing customer base in Germany, a CSP may build one or more data centers in a new region in Germany.

Building a data center (or multiple data centers) in a region is sometimes also referred to as building a region. The term "region build" is used to refer to building one or more data centers in a region. Building a data center in a region involves provisioning or creating a set of new resources that are needed or used for providing a set of services that the data center is configured to provide. The end result of the region build process is the creation of a data center in a region, where the data center is capable of providing a set of services intended for that data center and includes a set of resources that are used to provide the set of services.

Building a new data center in a region is a very complex activity requiring extensive coordination between various bootstrapping activities. At a high level, this involves the performance and coordination of various tasks such as: identifying the set of services to be provided by the data center; identifying various resources that are needed for providing the set of services; creating, provisioning, and deploying the identified resources; wiring the resources properly so that they can be used in an intended manner; and the like. Each of these tasks further have subtasks that need to be coordinated, further adding to the complexity. Due to this complexity, presently, the building of a data center in a region involves several manually initiated or manually controlled tasks that require careful manual coordination. As a result, the task of building a new region (i.e., building one or more data centers in a region) is very time consuming. It can take time, for example many months, to build a data center. Additionally, the process is very error prone, sometimes requiring several iterations before a desired configuration of the data center is achieved, which further adds to the time taken to build a data center. These limitations and problems severely limit a CSP's ability to grow computing resources in a timely manner responsive to increasing customer needs.

The present disclosure describes techniques for reducing build time, reducing computing resource waste, and reducing risk related to building one or more data centers in a region. Instead of weeks and months needed to build a data center in a region in the past, the techniques described herein can be used to build a new data center in a region in a relatively much shorter time, while reducing the risk of errors over conventional approaches.

A Cloud Infrastructure Orchestration Service (CIOS) is disclosed herein that is configured to bootstrap (e.g., provision and deploy) services into a new data center based on predefined configuration files that identify the resources (e.g., infrastructure components and software to be deployed) for implementing a given change to the data center. The CIOS can parse and analyze configuration files (e.g., flock configs) to identify dependencies between resources, execution targets, phases, and flocks. The CIOS may generate specific data structures from the analysis and may use these data structures to drive operations and to manage an order by which services are bootstrapped to a region. The CIOS may utilize these data structures to identify when it can bootstrap a service, when bootstrapping is blocked, and/or when bootstrapping operations associated with a previously blocked service can resume. Advantageously, the CIOS can identify circular dependencies within the data structures and execute operations to eliminate/resolve these circular dependencies prior to task execution. Using these techniques, the CIOS substantially reduces the risk of executing tasks prior to the availability of the resources on which those tasks depend.

Utilizing the techniques disclosed herein, the CIOS may optimize parallel processing to execute changes to a data center while ensuring that tasks are not initiated until the functionality on which those tasks depend is available in the region. In this manner, the CIOS enables a region build to be performed more efficiently, which greatly reduces the time required to build a data center and the wasteful computing resource use found in conventional approaches.

CERTAIN DEFINITIONS

A "region" is a logical abstraction corresponding to a geographical location. A region can include any suitable number of one or more execution targets. In some embodiments, an execution target could correspond to a data center.

An "execution target" refers to a smallest unit of change for executing a release. A "release" refers to a representation of an intent to orchestrate a specific change to a service (e.g., deploy version 8, "add an internal DNS record," etc.). For most services, an execution target represents an "instance" of a service. A single service can be bootstrapped to each of one or more execution targets. An execution target may be associated with a set of devices (e.g., a data center).

"Bootstrapping" is intended to refer to the collective tasks associated with provisioning and deployment of any suitable number of resources (e.g., infrastructure components, artifacts, etc.) corresponding to a single service.

A "service" refers to functionality provided by a set of resources. A set of resources for a service includes any suitable combination of infrastructure, platform, or software (e.g., an application) hosted by a cloud provider that can be configured to provide the functionality of a service. A service can be made available to users through the Internet.

An "artifact" refers to code being deployed to an infrastructure component or a Kubernetes engine cluster, this may include software (e.g., an application), configuration information (e.g., a configuration file) for an infrastructure component, or the like.

A "flock config" refers to a configuration file (or a set of configuration files) that describes a set of all resources (e.g., infrastructure components and artifacts) associated with a single service. A flock config may include declarative statements that specify one or more aspects corresponding to a desired state of the resources of the service.

"Service state" refers to a point-in-time snapshot of every resource (e.g., infrastructure resources, artifacts, etc.) associated with the service. The service state indicates status corresponding to provisioning and/or deployment tasks associated with service resources.

IaaS provisioning (or "provisioning") refers to acquiring computers or virtual hosts for use, and even installing needed libraries or services on them. The phrase "provisioning a device" refers to evolving a device to a state in which it can be utilized by an end-user for their specific use. A device that has undergone the provisioning process may be referred to as a "provisioned device." Preparing the provisioned device (installing libraries and daemons) may be part of provisioning; this preparation is different from deploying new applications or new versions of an application onto the prepared device. In most cases, deployment does not include provisioning, and the provisioning may need to be performed first. Once prepared, the device may be referred to as "an infrastructure component."

IaaS deployment (or "deployment") refers to the process of providing and/or installing a new application, or a new version of an application, onto a provisioned infrastructure component. Once the infrastructure component has been provisioned (e.g., acquired, assigned, prepared, etc.), additional software may be deployed (e.g., provided to and installed on the infrastructure component). The infrastructure component can be referred to as a "resource" after provisioning and deployment has concluded. Examples of resources may include, but are not limited to, virtual machines, databases, object storage, block storage, load balancers, and the like.

A "capability" identifies a unit of functionality associated with a service. The unit could be a portion, or all, of the functionality to be provided by the service. By way of example, a capability can be published indicating that a resource is available for authorization/authentication processing (e.g., a subset of the functionality to be provided by the resource). As another example, a capability can be published indicating the full functionality of the service is available. Capabilities can be used to identify functionality on which a resource or service depends and/or functionality of a resource or service that is available for use.

A "virtual bootstrap environment" (ViBE) refers to a virtual cloud network that is provisioned in the overlay of an existing region (e.g., a "host region"). Once provisioned, a ViBE is connected to a new region using a communication channel (e.g., an IPSec Tunnel VPN). Certain essential core services (or "seed" services) like a deployment orchestrator, a public key infrastructure (PKI) service, and the like can be provisioned in a ViBE. These services can provide the capabilities required to bring the hardware online, establish a chain of trust to the new region, and deploy the remaining services in the new region. Utilizing the virtual bootstrap environment can prevent circular dependencies between bootstrapping resources by utilizing resources of the host region. Services can be staged and tested in the ViBE prior to the physical region (e.g., the target region) being available.

A "Cloud Infrastructure Orchestration Service" (CIOS) may refer to a system configured to manage provisioning and deployment operations for any suitable number of services as part of a region build.

A Multi-Flock Orchestrator (MFO) may be a computing component (e.g., a service) that coordinates events between components of the CIOS to provision and deploy services to a target region (e.g., a new region). An MFO tracks relevant events for each service of the region build and takes actions in response to those events.

A "host region" refers to a region that hosts a virtual bootstrap environment (ViBE). A host region may be used to bootstrap a ViBE.

A "target region" refers to a region under build.

"Publishing a capability" refers to "publishing" as used in a "publisher-subscriber" computing design or otherwise providing an indication that a particular capability is available (or unavailable). The capabilities are "published" (e.g., collected by a capabilities service, provided to a capabilities service, pushed, pulled, etc.) to provide an indication that functionality of a resource/service is available. In some embodiments, capabilities may be published/transmitted via an event, a notification, a data transmission, a function call, an API call, or the like. An event (or other notification/data transmission/etc.) indicating availability of a particular capability can be broadcasted/addressed (e.g., published) to a capabilities service.

A "Capabilities Service" may be a flock configured to model dependencies between different flocks. A capabilities service may be provided within a Cloud Infrastructure Orchestration Service and may define what capabilities, services, features have been made available in a region.

A "Real-time Regional Data Distributor" (RRDD) may be a service or system configured to manage region data. This region data can be injected into flock configs to dynamically create execution targets for new regions.

In some examples, techniques for implementing a Cloud Infrastructure Orchestration Service (CIOS) are described herein. Such techniques, as described briefly above, can be configured to manage bootstrapping (e.g., provisioning and deploying software to) infrastructure components within a cloud environment (e.g., a region). In some instances, the CIOS can include computing components (e.g., a CIOS Central and a CIOS Regional, both of which will be described in further detail below) that may be configured to manage bootstrapping tasks (provisioning and deployment) for a given service and a Multi-Flock Orchestrator (also described in further detail below) configured to initiate/manage region builds (e.g., bootstrapping operations corresponding to multiple services).

The CIOS enables region building and world-wide infrastructure provisioning and code deployment with minimal manual run-time effort from service teams (e.g., beyond an initial approval and/or physical transportation of hardware, in some instances). The high-level responsibilities of the CIOS include, but are not limited to, coordinating region builds, providing users with a view of the current state of resources managed by the CIOS (e.g., of a region, across regions, world-wide, etc.), and managing bootstrapping operations for bootstrapping resources within a region.

The CIOS may provide view reconciliation, where a view of a desired state (e.g., a desired configuration) of resources may be reconciled with a current/actual state (e.g., a current configuration) of the resources. In some instances, view reconciliation may include obtaining state data to identify what resources are actually running and their current configuration and/or state. Reconciliation can be performed at a variety of granularities, such as at a service level.

The CIOS can perform plan generation, where differences between the desired and current state of the resources are identified. Part of plan generation can include identifying the operations that would need to be executed to bring the resources from the current state to the desired state. In some examples, the CIOS may present a generated plan to a user for approval. In these examples, the CIOS can mark the plan as approved or rejected based on user input from the user. Thus, users can spend less time reasoning about the plan and the plans are more accurate because they are machine generated. Plans are almost too detailed for human consumption; however, the CIOS can provide this data via a sophisticated user interface (UI).

In some examples, the CIOS can handle execution of change management by executing the approved plan. Once an execution plan has been created and approved, engineers may no longer need to participate in change management unless the CIOS initiates roll-back. The CIOS can handle rolling back to a previous service version by generating a plan that returns the service to a previous (e.g., pre-release) state (e.g., when CIOS detects service health degradation while executing).

The CIOS can measure service health by monitoring alarms and executing integration tests. The CIOS can help teams quickly define roll-back behavior in the event of service degradation, which it can later execute. The CIOS can generate and display plans and can track approval. The CIOS can combine the functionality of provisioning and deployment in a single system that coordinates these tasks across a region build. The CIOS also supports the discovery of flocks (e.g., service resources such as flock config(s) corresponding to any suitable number of services), artifacts, resources, and dependencies. The CIOS can discover dependencies between execution tasks at every level (e.g., resource level, execution target level, phase level, service level, etc.) through a static analysis (e.g., including parsing and processing content) of one or more configuration files. Using these dependencies, the CIOS can generate various data structures from these dependencies that can be used to drive task execution (e.g., tasks regarding provisioning of infrastructure resources and deployment of artifacts across the region).

FIG. 1 is a block diagram of an environment 100 in which a Cloud Infrastructure Orchestration Service (CIOS) 102 may operate to dynamically provide bootstrap services in a region, according to at least one embodiment. CIOS 102 can include, but is not limited to, the following components: Real-time Regional Data Distributor (RRDD) 104, Multi-Flock Orchestrator (MFO) 106, CIOS Central 108, CIOS Regional 110, and Capabilities Service 112. Specific functionality of CIOS Central 108 and CIOS Regional 110 is provided in more detail in U.S. application Ser. No. 17/016,754, entitled "Techniques for Deploying Infrastructure Resources with a Declarative Provisioning Tool," the entire contents of which are incorporated in its entirety for all purposes. In some embodiments, any suitable combination of the components of CIOS 102 may be provided as a service. In some embodiments, some portion of CIOS 102 may be deployed to a region (e.g., a data center represented by host region 103). In some embodiments, CIOS 102 may include any suitable number of cloud services (not depicted in FIG. 1) discussed in further detail in U.S. application Ser. No. 17/016,754 and below with respect to FIGS. 2 and 3.

Real-time Regional Data Distributor (RRDD) 104 may be configured to maintain and provide region data that identifies realms, regions, execution targets, and availability domains. In some cases, the region data may be in any suitable form (e.g., JSON format, data objects/containers, XML, etc.). Region data maintained by RRDD 104 may include any suitable number of subsets of data which can individually be referenceable by a corresponding identifier. By way of example, an identifier "all regions" can be associated with a data structure (e.g., a list, a structure, an object, etc.) that includes a metadata for all defined regions. As another example, an identifier such as "realms" can be associated with a data structure that identifies metadata for a number of realms and a set of regions corresponding to each realm. In general, the region data may maintain any suitable attribute of one or more realm(s), region(s), availability domains (ADs), execution target(s) (ETs), and the like, such as identifiers, DNS suffixes, states (e.g., a state of a region), and the like. The RRDD 104 may be configured to manage region state as part of the region data. A region state may include any suitable information indicating a state of bootstrapping within a region. By way of example, some example region states can include "initial," "building," "production," "paused," or "deprecated." The "initial" state may indicate a region that has not yet been bootstrapped. A "building" state may indicate that bootstrapping of one or more flocks within the region has commenced. A "production" state may indicate that bootstrapping has been completed and the region is ready for validation. A "paused" state may indicate that CIOS Central 108 or CIOS Regional 110 has paused internal interactions with the regional stack, likely due to an operational issue. A "deprecated" state may indicate the region has been deprecated and is likely unavailable and/or will not be contacted again.

CIOS Central 108 is configured to provide any suitable number of user interfaces with which users (e.g., user 109) may interact with CIOS 102. By way of example, users can make changes to region data via a user interface provided by CIOS Central 108. CIOS Central 108 may additionally provide a variety of interfaces that enable users to: view changes made to flock configs and/or artifacts, generate and view plans, approve/reject plans, view status on plan execution (e.g., corresponding to tasks involving infrastructure provisioning, deployment, region build, and/or desired state of any suitable number of resources managed by CIOS 102. CIOS Central 108 may implement a control plane configured to manage any suitable number of CIOS Regional 110 instances. CIOS Central 108 can provide one or more user interfaces for presenting region data, enabling the user 109 to view and/or change region data. CIOS Central 108 can be configured to invoke the functionality of RRDD 104 via any suitable number of interfaces. Generally, CIOS Central 108 may be configured to manage region data, either directly or indirectly (e.g., via RRDD 104). CIOS Central 108 may be configured to compile flock configs to inject region data as variables within the flock configs.

Each instance of CIOS Regional 110 may correspond to a module configured to execute bootstrapping tasks that are associated with a single service of a region. CIOS Regional 110 can receive desired state data from CIOS Central 108. In some embodiments, desired state data may include a flock config that declares (e.g., via declarative statements) a desired state of resources associated with a service. CIOS Central 108 can maintain current state data indicating any suitable aspect of the current state of the resources associated with a service. In some embodiments, CIOS Regional 110 can identify, through a comparison of the desired state data and the current state data, that changes are needed to one or more resources. For example, CIOS Regional 110 can determine that one or more infrastructure components need to be provisioned, one or more artifacts deployed, or any suitable change needed to the resources of the service to bring the state of those resources in line with the desired state. As CIOS Regional 110 performs bootstrapping operations, it may publish data indicating various capabilities of a resource as they become available. A "capability" identifies a unit of functionality associated with a service. The unit could be a portion, or all of the functionality to be provided by the service. By way of example, a capability can be published indicating that a resource is available for authorization/authentication processing (e.g., a subset of the functionality to be provided by the resource). As another example, a capability can be published indicating the full functionality of the service is available. Capabilities can be used to identify functionality on which a resource or service depends and/or functionality of a resource or service that is available for use.

Capabilities Service 112 is configured to maintain capabilities data that indicates 1) what capabilities of various services are currently available, 2) whether any resource/service is waiting on a particular capability, 3) what particular resources and/or services are waiting on a given capability, or any suitable combination of the above. Capabilities Service 112 may provide an interface with which capabilities data may be requested. Capabilities Service 112 may provide one or more interfaces (e.g., application programming interfaces) that enable it to transmit capabilities data to MFO 106 and/or CIOS Regional 110 (e.g., each instance of CIOS Regional 110). In some embodiments, MFO 106 and/or any suitable component or module of CIOS Regional 110 may be configured to request capabilities data from Capabilities Service 112.

In some embodiments, Multi-Flock Orchestrator (MFO) 106 may be configured to drive region build efforts. In some embodiments, MFO 106 can manage information that describes what flock/flock config versions and/or artifact versions are to be utilized to bootstrap a given service within a region (or to make a unit of change to a target region). In some embodiments, MFO 106 may be configured to monitor (or be otherwise notified of) changes to the region data managed by Real-time Regional Data Distributor 104. In some embodiments, receiving an indication that region data has been changed may cause a region build to be triggered by MFO 106. In some embodiments, MFO 106 may collect various flock configs and artifacts to be used for a region build. Some, or all, of the flock configs may be configured to be region agnostic. That is, the flock configs may not explicitly identify what regions to which the flock is to be bootstrapped. In some embodiments, MFO 106 may trigger a data injection process through which the collected flock configs are recompiled (e.g., by CIOS Central 108). During recompilation, operations may be executed (e.g., by CIOS Central 108) to cause the region data maintained by Real-time Regional Data Distributor 104 to be injected into the config files. Flock configs can reference region data through variables/parameters without requiring hard-coded identification of region data. The flock configs can be dynamically modified at run time using this data injection rather than having the region data be hardcoded, and therefore, and more difficult to change.

Multi-Flock Orchestrator 106 can perform a static flock analysis in which the flock configs are parsed to identify dependencies between resources, execution targets, phases, and flocks, and in particular to identify circular dependencies that need to be removed. In some embodiments, MFO 106 can generate any suitable number of data structures based on the dependencies identified. These data structures (e.g., directed acyclic graph(s), linked lists, etc.) may be utilized by the Cloud Infrastructure Orchestration Service 102 to drive operations for performing a region build. By way of example, these data structures may collectively define an order by which services are bootstrapped within a region. An example of such a data structure is discussed further below with respect to Build Dependency Graph 338 of FIG. 3. If circular dependencies (e.g., service A requires service B and vice versa) exist and are identified through the static flock analysis and/or graph, MFO may be configured to notify any suitable service teams that changes are required to the corresponding flock config to correct these circular dependencies. MFO 106 can be configured to traverse one or more data structures to manage an order by which services are bootstrapped to a region. MFO 106 can identify (e.g., using data obtained from Capabilities Service 112) capabilities available within a given region at any given time. MFO 106 can this data to identify when it can bootstrap a service, when bootstrapping is blocked, and/or when bootstrapping operations associated with a previously blocked service can resume. Based on this traversal, MFO 106 can perform a variety of releases in which instructions are transmitted by MFO 106 to CIOS Central 108 to perform bootstrapping operations corresponding to any suitable number of flock configs. In some examples, MFO 106 may be configured to identify that one or more flock configs may require multiple releases due to circular dependencies found within the graph. As a result, MFO 106 may transmit multiple instruction sets to CIOS Central 108 for a given flock config to break the circular dependencies identified in the graph.

In some embodiments, a user can request that a new region (e.g., target region 114) be built. This can involve bootstrapping resources corresponding to a variety of services. In some embodiments, target region 114 may not be communicatively available (and/or secure) at a time at which the region build request is initiated. Rather than delay bootstrapping until such time as target region 114 is available and configured to perform bootstrapping operations, CIOS 102 may initiate the region build using a virtual bootstrap environment 116. Virtual bootstrap environment (ViBE) 116 may be an overlay network that is hosted by host region 103 (a preexisting region that has previously been configured with a core set of services and which is communicatively available and secure). MFO 106 can leverage resources of the host region 103 to bootstrap resources to the ViBE 116 (generally referred to as "building the ViBE"). By way of example, MFO 106 can provide instructions through CIOS Central 108 that cause an instance of CIOS Regional 110 within a host region (e.g., host region 103) to bootstrap another instance of CIOS Regional within the ViBE 116. Once the CIOS Regional within the ViBE is available for processing, bootstrapping the services for the target region 114 can continue within the ViBE 116. When target region 114 is available to perform bootstrapping operations, the previously bootstrapped services within ViBE 116 may be migrated to target region 114. Utilizing these techniques, CIOS 102 can greatly improve the speed at which a region is built by drastically reducing the need for any manual input and/or configuration to be provided.

Figure 2:
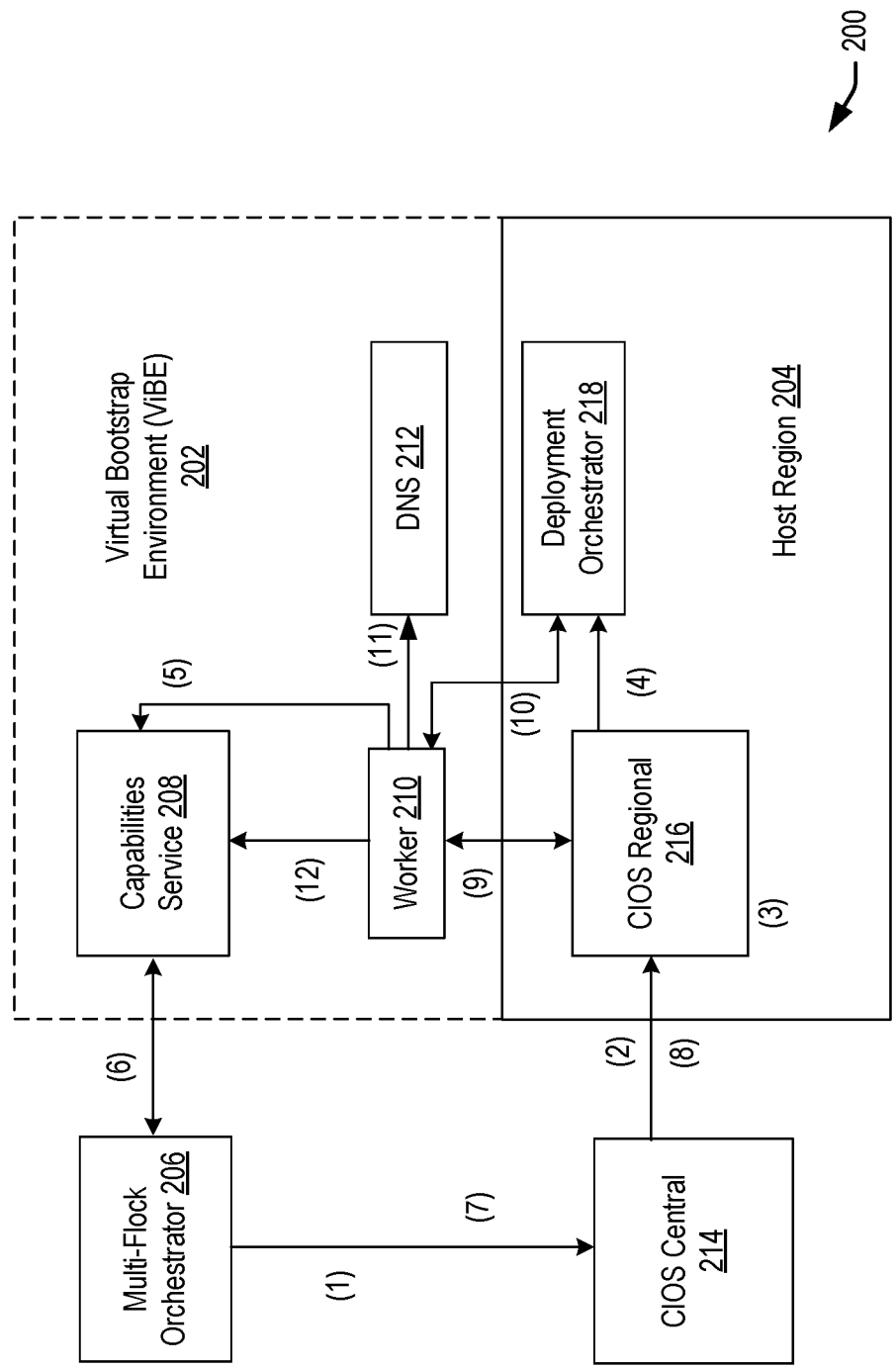
FIG. 2 is a block diagram for illustrating an environment and method for building a virtual bootstrap environment (ViBE), according to at least one embodiment.

FIG. 2 is a block diagram for illustrating an environment 200 and method for building a virtual bootstrap environment (ViBE) 202 (an example of ViBE 116 of FIG. 1), according to at least one embodiment. ViBE 202 represents a virtual cloud network that is provisioned in the overlay of an existing region (e.g., host region 204, an example of the host region 103 of FIG. 1 and in an embodiment is a Host Region Service Enclave). ViBE 202 represents an environment in which services can be staged for a target region (e.g., a region under build such as target region 114 of FIG. 1) before the target region becomes available.

In order to bootstrap a new region (e.g., target region 114 of FIG. 1), a core set of services may be bootstrapped. While those core set of services exist in the host region 204, they do not yet exist in the ViBE (nor the target region). These essential core services provide the functionality needed to provision devices, establish a chain of trust to the new region, and deploy remaining services (e.g., flocks) into a region. The ViBE 202 may be a tenancy that is deployed in a host region 204. It can be thought of as a virtual region.

When the target region is available to provide bootstrapping operations, the ViBE 202 can be connected to the target region so that services in the ViBE can interact with the services and/or infrastructure components of the target region. This will enable deployment of production level services, instead of self-contained seed services as in previous systems, and will require connectivity over the internet to the target region. Conventionally, a seed service was deployed as part of a container collection and used to bootstrap dependencies necessary to build out the region. Using infrastructure/tooling of an existing region, resources may be bootstrapped (e.g., provisioned and deployed) into the ViBE 202 and connected to the service enclave of a region (e.g., host region 204) in order to provision hardware and deploy services until the target region is self-sufficient and can be communicated with directly. Utilizing the ViBE 202 allows for standing up the dependencies and services needed to be able to provision/prepare infrastructure and deploy software while making use of the host region's resources in order to break circular dependencies of core services.

Multi-Flock Orchestrator (MFO) 206 may be configured to perform operations to build (e.g., configure) ViBE 202. MFO 206 can obtain applicable flock configs corresponding to various resources to be bootstrapped to the new region (in this case, a ViBE region, ViBE 202). By way of example, MFO 206 may obtain a flock config (e.g., a "ViBE flock config") that identifies aspects of bootstrapping Capabilities Service 208 and Worker 210. As another example, MFO 206 may obtain another flock config corresponding to bootstrapping Domain Name Service (DNS) 212 to ViBE 202.

At step 1, MFO 206 may instruct CIOS Central 214 (e.g., an example of CIOS Central 108 and CIOS Central 214 of FIGS. 1 and 2, respectively). For example, MFO 206 may transmit a request (e.g., including the ViBE flock config) to request bootstrapping of the Capabilities Service 208 and Worker 210 that, at this time do not yet exist in the ViBE 202. In some embodiments, CIOS Central 214 may have access to all flock configs. Therefore, in some examples, MFO 206 may transmit an identifier for the ViBE flock config rather than the file itself, and CIOS Central 214 may independently obtain it from storage (e.g., from DB 308 or flock DB 312 of FIG. 3).

At step 2, CIOS Central 214 may provide the ViBE flock config via a corresponding request to CIOS Regional 216. CIOS Regional 216 may parse the ViBE flock config to identify and execute specific infrastructure provisioning and deployment operations at step 3.

In some embodiments, the CIOS Regional 216 may utilize additional corresponding services for provisioning and deployment. For example, at step 4, CIOS Regional 216 CIOS Regional may instruct deployment orchestrator 218 (e.g., an example of a core service, or other write, build, and deploy applications software, of the host region 204) to execute instructions that in turn cause Capabilities Service 208 and Worker 210 to be bootstrapped within ViBE 202.

At step 5, a capability may be transmitted to the Capabilities Service 208 (from the CIOS Regional 216, Deployment Orchestrator 218 via the Worker 210 or otherwise) indicating that resources corresponding to the ViBE flock are available. Capabilities Service 208 may persist this data. In some embodiments, the Capabilities Service 208 adds this information to a list it maintains of available capabilities with the ViBE. By way of example, the capability provided to Capabilities Service 208 at step 5 may indicate the Capabilities Service 208 and Worker 210 are available for processing.

At step 6, MFO 206 may identify that the capability indicating that Capabilities Service 208 and Worker 210 are available based on receiving or obtaining data (an identifier corresponding to the capability) from the Capabilities Service 208.

At step 7, as a result of receiving/obtaining the data at step 6, the MFO 206 may instruct CIOS Central 214 to bootstrap a DNS service (e.g., DNS 212) to the ViBE 202. The instructions may identify or include a particular flock config corresponding to the DNS service.

At step 8, the CIOS Central 214 may instruct the CIOS Regional 216 to deploy DNS 212 to the ViBE 202. In some embodiments, the DNS flock config for the DNS 212 is provided by the CIOS Central 214.

At step 9, Worker 210, now that it is deployed in the ViBE 202, may be assigned by CIOS Regional 216 to the task of deploying DNS 212. Worker may execute a declarative infrastructure provisioner in the manner described above in connection with FIG. 3 to identify (e.g., from comparing the flock config (the desired state) to a current state of the (currently non-existing) resources associated with the flock) a set of operations that need to be executed to deploy DNS 212.

At step 10, the Deployment Orchestrator 218 may instruct Worker 210 to deploy DNS 212 in accordance with the operations identified at step 9. As depicted, Worker 210 proceeds with executing operations to deploy DNS 212 to ViBE 202 at step 11. At step 12, Worker 210 notifies Capabilities Service 208 that DNS 212 is available in ViBE 202. MFO 206 may subsequently identify that the resources associated with the ViBE flock config and the DNS flock config are available any may proceed to bootstrap any suitable number of additional resources to the ViBE.

After steps 1-12 are concluded, the process for building the ViBE 202 can be considered complete and the ViBE 202 can be considered built.

Figure 3:
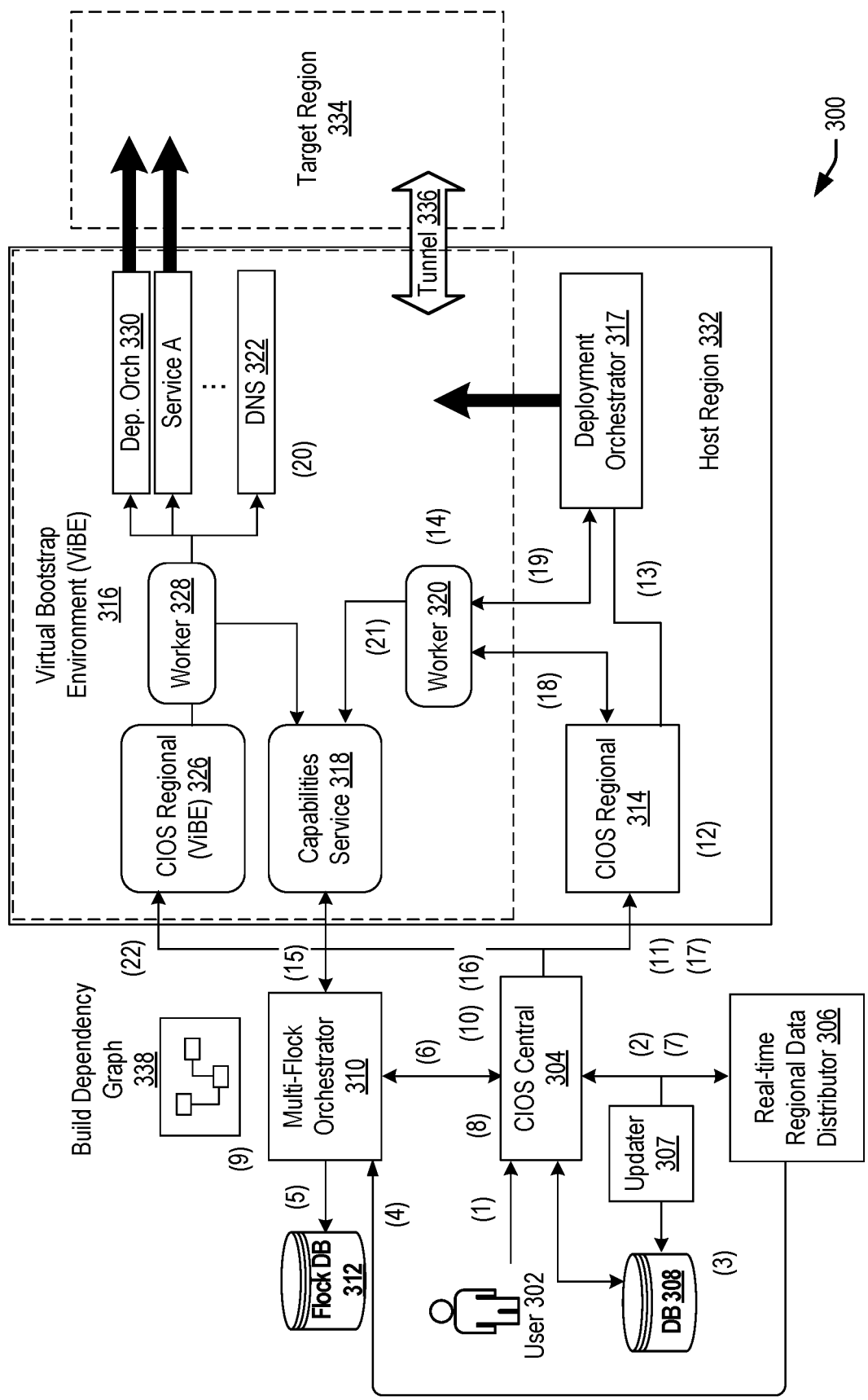
FIG. 3 is a block diagram for illustrating an environment and method for bootstrapping services to a target region utilizing the ViBE, according to at least one embodiment.

FIG. 3 is a block diagram for illustrating an environment 300 and method for bootstrapping services to a target region utilizing the ViBE, according to at least one embodiment.

At step 1, user 302 may utilize any suitable user interface provided by CIOS Central 304 (an example of CIOS Central 108 and CIOS Central 214 of FIGS. 1 and 2, respectively) to modify region data. By way of example, user 302 may create a new region to which a number of services are to be bootstrapped.

At step 2, CIOS Central 304 may execute operations to send the change to RRDD 306 (e.g., an example of RRDD 104 of FIG. 1). At step 3, RRDD 306 may store the received region data in database 308, a data store configured to store region data including any suitable identifier, attribute, state, etc. of a region, AD, realm, ET, or the like. In some embodiments, updater 307 may be utilized to store region data in database 308 or any suitable data store from which such updates may be accessible (e.g., to service teams). In some embodiments, updater 307 may be configured to notify (e.g., via any suitable electronic notification) of updates made to database 308.

At step 4, MFO 310 (an example of the MFO 106 and 206 of FIGS. 1 and 2, respectively) may detect the change in region data. In some embodiments, MFO 310 may be configured to poll RRDD 306 for changes in region data. In some embodiments, RRDD 306 may be configured to publish or otherwise notify MFO 310 of region changes.

At step 5, detecting the change in region data may trigger MFO 310 to obtain a version set (e.g., a version set associated with a particular identifier such as a "golden version set" identifier). identifying a particular version for each flock (e.g., service) that is to be bootstrapped to the new region and a particular version for each artifact corresponding to that flock. The version set may be obtained from DB 312. As flocks evolve and change, the versions for their corresponding configs and artifacts used for region build may change. These changes may be persisted in flock DB 312 such that MFO 310 may identify which versions of flock configs and artifacts to use for building a region (e.g., a ViBE region, a Target Region/non-ViBE Region, etc.). The flock configs (e.g., all versions of the flock configs) and/or artifacts (e.g., all versions of the artifacts) may be stored in DB 308, DB 312, or any suitable data store accessible to the CIOS Central 304 and/or MFO 310.

At step 6, MFO 310 may request CIOS Central 304 to recompile of each of the flock configs associated with the version set with the current region data. In some embodiments, the request may indicate a version for each flock config and/or artifact corresponding to those flock configs.

At step 7, CIOS Central 304 may obtain current region data from the DB 308 (e.g., directly, or via Real-time Regional Data Distributor 306) and retrieve any suitable flock config and artifact in accordance with the versions requested by MFO 310.

At step 8, CIOS Central 304 may recompile the flock configs with the region data obtained at step 7 to inject the flock configs with current region data. CIOS Central 304 may return the compiled flock configs to MFO 310. In some embodiments, CIOS Central 304 may simply indicate compilation is done, and MFO 310 may access the recompiled flock configs via RRDD 306.

At step 9, MFO 310 may perform a static analysis of the recompiled flock configs. As part of the static analysis, MFO 310 may parse the flock configs (e.g., using a library associated with a declarative infrastructure provisioner (e.g., Terraform, or the like)) to identify dependencies between flocks. From the analysis and the dependencies identified, MFO 310 can generate Build Dependency Graph 338. Build Dependency Graph 338 may be an acyclic directed graph that identifies an order by which flocks are to be bootstrapped (and/or changes indicated in flock configs are to be applied) to the new region. Each node in the graph may correspond to bootstrapping any suitable portion of a particular flock. The specific bootstrapping order may be identified based at least in part on the dependencies. In some embodiments, the dependencies may be expressed as an attribute of the node and/or indicated via edges of the graph that connect the nodes. MFO 310 may traverse the graph (e.g., beginning at a starting node) to drive the operations of the region build.

In some embodiments, MFO 310 may utilize a cycle detection algorithm to detect the presence of a cycle (e.g., service A depends on service B and vice versa). MFO 310 can identify orphaned capabilities dependencies. For example, MFO 310 can identify orphaned nodes of the Build Dependency Graph 338 that do not connect to any other nodes. MFO 310 may identify falsely published capabilities (e.g., when a capability was prematurely published, and the corresponding functionality is not actually yet available). MFO 310 can detect from the graph that one or more instances of publishing the same capability exist. In some embodiments, any suitable number of these errors may be detected and MFO 310 (or another suitable component such as CIOS Central 304) may be configured to notify or otherwise present this information to users (e.g., via an electronic notification, a user interface, or the like). In some embodiments, MFO 310 may be configured to force delete/recreate resources to break circular dependencies and may once again provide instructions to CIOS Central 304 to perform bootstrapping operations for those resources and/or corresponding flock configs.

A starting node may correspond to bootstrapping the ViBE flock, a second node may correspond to bootstrapping DNS. The steps 10-15 correspond to deploying (via deployment orchestrator 317, an example of the deployment orchestrator 218 of FIG. 2) a ViBE flock to ViBE 316 (e.g., an example of ViBE 116 and 202 of FIGS. 1, and 2, respectively). That is, steps 10-15 of FIG. 3 generally correspond to steps 1-6 of FIG. 2. Once notified that capabilities exist corresponding to the ViBE flock being deployed (e.g., indicating that Capabilities Service 318 and Worker 320, corresponding to Capabilities Service 208 and Worker 210 of FIG. 2, are available) the MFO 310 recommence traversal of the Build Dependency Graph 338 to identify next operations to be executed.

By way of example, MFO 310 may continue traversing the Build Dependency Graph 338 to identify that a DNS flock is to be deployed. Steps 16-21 may be executed to deploy DNS 322 (an example of the DNS 212 of FIG. 2). These operations may generally correspond to steps 7-12 of FIG. 2.

At step 21, a capability may be stored indicating that DNS 322 is available. Upon detecting this capability, MFO 310 may recommence traversal of the Build Dependency Graph 338. On this traversal, the MFO 310 may identify that any suitable portion of an instance of CIOS Regional (e.g., an example of CIOS Regional 314) is to be deployed to the ViBE 316. In some embodiments, steps 16-21 may be substantially repeated with respect to deploying CIOS Regional (ViBE) 326 (an instance of CIOS Regional 314, CIOS Regional 110 of FIG. 1) and Worker 328 to the ViBE 316. A capability may be transmitted to the Capabilities Service 318 that CIOS Regional (ViBE) 326 is available.

Upon detecting the CIOS Regional (ViBE) 326 is available, MFO 310 may recommence traversal of the Build Dependency Graph 338. On this traversal, the MFO 310 may identify that a deployment orchestrator (e.g., Deployment Orchestrator 330, an example of the Deployment Orchestrator 317) is to be deployed to the ViBE 316. In some embodiments, steps 16-21 may be substantially repeated with respect to deploying Deployment Orchestrator 330. Information that identifies a capability may be transmitted to the Capabilities Service 318, indicating that Deployment Orchestrator 330 is available.

After Deployment Orchestrator 330 is deployed, ViBE 316 may be considered available for processing subsequent requests. Upon detecting Deployment Orchestrator 330 is available, MFO 310 may instruct subsequent bootstrapping requests to be routed to ViBE components rather than utilizing host region components (components of host region 332). Thus, MFO 310 can continue traversing the Build Dependency Graph 338, at each node instructing flock deployment to the ViBE 316 via CIOS Central 304. CIOS Central 304 may request CIOS Regional (ViBE) 326 to deploy resources according to the flock config.

At some point during this process, Target Region 334 may become available. Indication that the Target Region is available may be identifiable from region data for the Target Region 334 being provided by the user 302 (e.g., as an update to the region data). The availability of Target Region 334 may depend on establishing a network connection between the Target Region 334 and external networks (e.g., the Internet). The network connection may be supported over a public network (e.g., the Internet), but use software security tools (e.g., IPSec) to provide one or more encrypted tunnels (e.g., IPSec tunnels such as tunnel 336) from the ViBE 316 to Target Region 334. As used herein, "IPSec" refers to a protocol suite for authenticating and encrypting network traffic over a network that uses Internet Protocol (IP) and can include one or more available implementations of the protocol suite (e.g., Openswan, Libreswan, strongSwan, etc.). The network may connect the ViBE 316 to the service enclave of the Target Region 334.

Prior to establishing the IPSec tunnels, the initial network connection to the Target Region 334 may be on a connection (e.g., an out-of-band VPN tunnel) sufficient to allow bootstrapping of networking services until an IPSec gateway may be deployed on an asset (e.g., bare-metal asset) in the Target Region 334. To bootstrap the Target Region's 334 network resources, Deployment Orchestrator 330 can deploy the IPSec gateway at the asset within Target Region 334. The Deployment Orchestrator 330 may then deploy VPN hosts at the Target Region 334 configured to terminate IPSec tunnels from the ViBE 316. Once services (e.g., Deployment Orchestrator 330, Service A, etc.) in the ViBE 316 can establish an IPSec connection with the VPN hosts in the Target Region 334, bootstrapping operations from the ViBE 316 to the Target Region 334 may begin.

In some embodiments, the bootstrapping operations may begin with services in the ViBE 316 provisioning resources in the Target Region 334 to support hosting instances of core services as they are deployed from the ViBE 316. For example, a host provisioning service may provision hypervisors on infrastructure (e.g., bare-metal hosts) in the Target Region 334 to allocate computing resources for VMs. When the host provisioning service completes allocation of physical resources in the Target Region 334, the host provisioning service may publish information indicating a capability that indicates that the physical resources in the Target Region 334 have been allocated. The capability may be published to Capabilities Service 318 via CIOS Regional (ViBE) 326 (e.g., by Worker 328).

With the hardware allocation of the Target Region 334 established and posted to capabilities service 318, CIOS Regional (ViBE) 326 can orchestrate the deployment of instances of core services from the ViBE 316 to the Target Region 334. This deployment may be similar to the processes described above for building the ViBE 316, but using components of the ViBE (e.g., CIOS Regional (ViBE) 326, Worker 328, Deployment Orchestrator 330) instead of components of the Host Region 332 service enclave. The deployment operations may generally correspond to steps 16-21 described above.

As a service is deployed from the ViBE 316 to the Target Region 334, the DNS record associated with that service may correspond to the instance of the service in the ViBE 316. The DNS record associated with the service may be updated at a later time to complete deployment of the service to the Target Region 334. Said another way, the instance of the service in the ViBE 316 may continue to receive traffic (e.g., requests) to the service until the DNS record is updated. A service may deploy partially into the Target Region 334 and publish information indicating a capability (e.g., to Capabilities Service 318) that the service is partially deployed. For example, a service running in the ViBE 316 may be deployed into the Target Region 334 with a corresponding compute instance, load balancer, and associated applications and other software, but may need to wait for database data to migrate to the Target Region 334 before being completely deployed. The DNS record (e.g., managed by DNS 322) may still be associated with the service in the ViBE 316. Once data migration for the service is complete, the DNS record may be updated to point to the operational service deployed in the Target Region 334. The deployed service in the Target Region 334 may then receive traffic (e.g., requests) for the service, while the instance of the service in the ViBE 316 may no longer receive traffic for the service.

Testing Infrastructure

Figure 4:
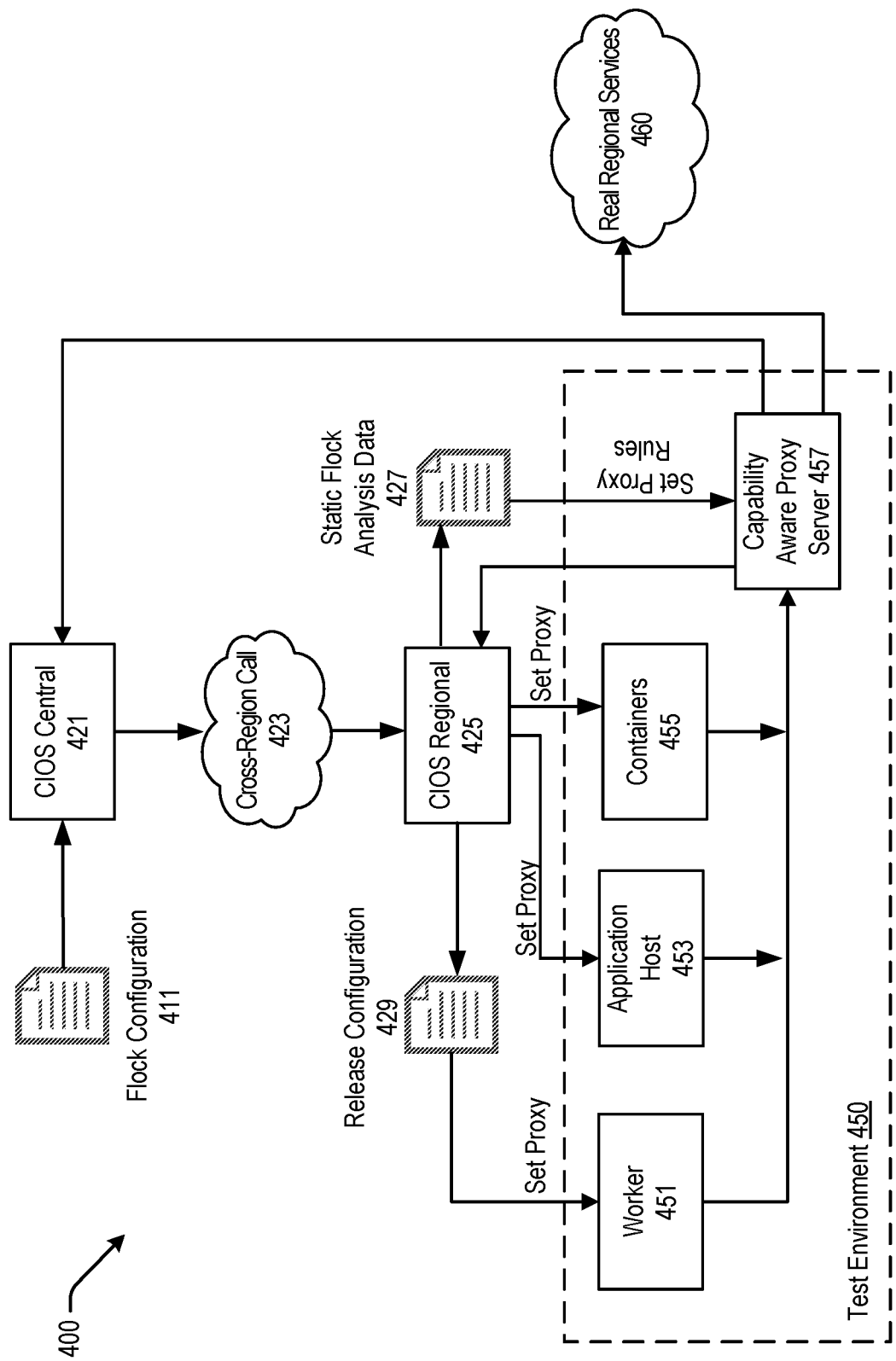
FIG. 4 is a block diagram of a system for testing a release of a flock configuration in accordance with some embodiments.

FIG. 4 is a block diagram of a system for testing a release of a flock configuration in accordance with some embodiments. As shown in FIG. 4, the system 400 includes a CIOS central module 421, a CIOS regional module 425, and a test environment 450. The test environment 450 includes a worker 451, one or more application hosts 453, one or more containers 455, and a capability aware proxy server 457.

As described previously with reference to FIG. 1, the CIOS central module 421 is configured to provide any suitable number of user interfaces with which users (e.g., user 109 of FIG. 1) may interact with the cloud infrastructure orchestration system e.g., CIOS 102. The CIOS central module 421 may provide one or more user interfaces for presenting region data, enabling the user 109 to view and/or change region data. Further, the CIOS central module 421 can be configured to invoke the functionality of a real-time regional data distributor (e.g., RRDD 104 of FIG. 1) via any suitable number of interfaces. Generally, CIOS central module 421 may be configured to manage region data, either directly or indirectly (e.g., via RRDD 104). Additionally, the CIOS central module 421 may be configured to receive and compile flock configurations.

According to some embodiments, the CIOS regional module 425 may be configured to execute bootstrapping tasks that are associated with a single service of a region. The CIOS regional module 425 can receive desired state data from the CIOS central module 421. In some embodiments, the desired state data may include a flock configuration that declares (e.g., via declarative statements) a desired state of resources associated with a service. As shown in FIG. 4, a flock configuration 411 (e.g., a configuration file of a service) may be received by the CIOS central module 421, which is transmitted to the CIOS regional module 425 via a network (denoted in FIG. 4 by a cross-region call 423).

By some embodiments, the CIOS regional module 425 is configured to perform a static flock analysis of the flock configuration 411 received from CIOS central 421. In performing the static flock analysis, the CIOS regional module 425 parses the flock configuration 411 to identify one or more pre-requisite capabilities that are required for execution of the flock. In some implementations, the one or more pre-requisite capabilities correspond to operations that may be performed with respect to one or more resource types such as creating keys (e.g., public, or private keys), deploying one or more data objects, etc. The CIOS regional module 425 upon completing the analysis of the flock configuration 411 generates a static flock analysis data 427. The static flock analysis data 427 includes information related to the pre-requisite capabilities (i.e., operations that may be performed with respect to resources associated with the service), as well as dependencies between resources or resource types, execution targets, etc.

In some implementations, the capability aware proxy server 457 that is included in the test environment 450 monitors execution of a release configuration of the flock (e.g., a test release of the flock configuration 411 that is desired to be deployed in a particular region). In order to enable the capability aware proxy server 457 to perform monitoring of the release configuration, one or more rules are established for the capability aware proxy server 457 (the rules are also referred to herein as proxy rules that are associated with the capability aware proxy server). In some implementations, information included in the static flock analysis data 427 is utilized to set the one or more rules for the capability aware proxy server 457. For example, each pre-requisite capability may correspond to a rule that is associated with the capability aware proxy server 457. As described below, the application host 453 included in the test environment 450 executes the release configuration of the flock. In such a case, if the application host attempts to perform operations such as accessing a particular resource type, deploying one or more containers in a specific data storage unit, etc., the operations are monitored by the capability aware proxy server 457. The capability aware proxy server 457 permits such operations based on the set of one or more rules.

In other words, the capability aware proxy server 457 determines whether execution of the release proceeds in accordance with the set of one or more rules. If a particular rule is violated (e.g., application host attempts to access a resource type that is not included in the pre-requisite capability), then the capability aware proxy server 457 may stop the execution of the release and provide in response, an exception error message. As such, the capability aware proxy server 457 is configured to monitor the execution of the release configuration 429 (i.e., a version of the flock configuration specific to a region that is to be deployed) based on the set of one or more rules.

Upon configuring the capability aware proxy server 457, the CIOS regional module 425 transmits the release configuration of the flock (e.g., a test release) to a worker 451 included in the test environment 450 for execution of the release in the test environment 450. In some implementations, the worker 451 mediates interactions between the CIOS regional module 425 and the capability aware proxy server 457. The worker 451 orchestrates the execution of the flock by provisioning resources in the test environment i.e., the worker performs mutations to the test environment 450 by creating resources such as compute instances, block storages, creating object buckets, etc. In some implementations, the worker 451 may provision the test environment with one or more application hosts 453 and containers 455 that are required to execute the flock release. It is appreciated that the application host(s) 453 execute artifacts (i.e., code) associated with the flock, while the container(s) 455, by one embodiment, may correspond to Kubernetes containers that include pieces of software such as system libraries, and other tools required to execute the flock.

As shown in FIG. 4, the real regional services 460 may correspond to a region that includes a full set of resources and may host the test environment 450. The application hosts 453 and containers 455 communicate with the capability aware proxy server 457 to gain access to one or more resources deployed in the real regional services 460. The capability aware proxy server 457 grants (to the application hosts 453 and containers 455) access to such resources included in the real regional services 460 based on the set of rules that are used to configure the capability aware proxy server 457.

In this manner the test environment 450 provides for a framework that provisions for the simulation testing of a flock. By some embodiments, the capability aware proxy server 457 monitors the execution of the release of the clock config in the test environment 450. The capability aware proxy server 457 may be configured to determine whether or not the release is executed in the test environment in a successful manner. In some implementations, the capability aware proxy server 457 is configured to generate a transcript including one or more events that occur during an execution of the release of the configuration file of the service in the test environment.

In one scenario, upon the flock release being executed successfully e.g., the capability aware proxy server was configured with all the capabilities required to execute the flock release, then the capability aware proxy server 457 may transmit a message indicating successful execution of the flock as well as transmit the transcript or log of the execution (including events that transpired in the execution) to the CIOS regional module 425. The CIOS regional module 425 may further relay the transcripts to the CIOS central module 421. It is noted that the message indicating successful execution may indicate to a system administrator that the particular flock is ready for real time deployment.

In contrast, in an alternative scenario where the capability aware proxy server 457 determines that execution of the flock release is unsuccessful, the capability aware proxy server 457 may transmit a message indicating the unsuccessful execution to CIOS regional module 425 as well as transmit a detailed transcript including events that transpired in the unsuccessful execution of the flock release. Details regarding the logs generated by the capability aware proxy server 457 are described next with reference to FIG. 5B.

Figure 5:
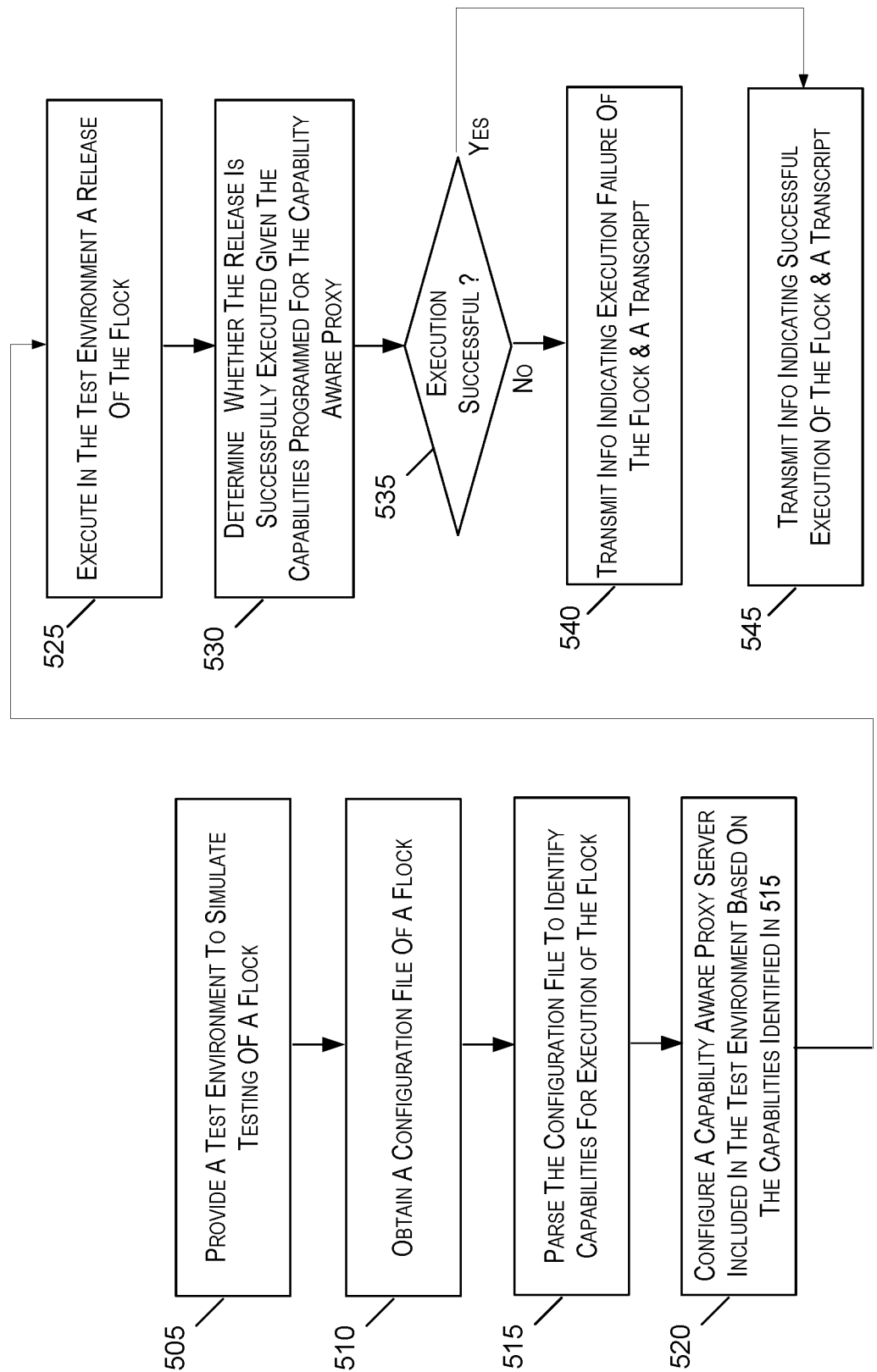
FIG. 5A depicts a flowchart illustrating steps performed in testing a flock configuration according to at least one embodiment.
FIG. 5B depicts an exemplary log generated by a capability aware proxy server, according to at least one embodiment.

FIG. 5A depicts a flowchart illustrating steps performed in testing a flock configuration according to at least one embodiment. The processing depicted in FIG. 5A may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 5A and described below is intended to be illustrative and non-limiting. Although FIG. 5A depicts the various processing steps occurring in a particular sequence or order, this is not intended to be limiting. In certain alternative embodiments, the steps may be performed in some different order or some steps may also be performed in parallel.

The process commences in 505, where a test environment is provided to simulate testing of a flock configuration. For instance, referring to FIG. 4, a test environment 450 may be provided to simulate testing of a release of the flock configuration. It is appreciated that the test environment includes a worker that provisions resources (e.g., application hosts, containers, etc.,) that are required to simulate the release of the flock configuration. Note that the test environment also includes a capability aware proxy server that is configured to monitor the testing of the flock configuration in the test environment. The process in 510 obtains a configuration file (i.e., a config file) of the flock. It is noted that the configuration file corresponds to a file that describes a set of all resources (e.g., infrastructure components and artifacts) associated with a single service. A flock config may include declarative statements that specify one or more aspects corresponding to a desired state of the resources of the service. On the other hand, a capability identifies a unit of functionality associated with a service e.g., capabilities correspond to operations performed with respect to one or more resource types such as creation of keys, deploying one or more data objects, publishing permission policies related to access of the one or more resource types, etc.

In 515, the configuration file of the flock is parsed (e.g., by CIOS regional) to identify pre-requisite capabilities that are required to execute the flock. In one implementation, the configuration file of the flock may be parsed to extract metadata associated with the flock. The metadata includes information related to the one or more pre-requisite capabilities that are required to execute the flock. Alternatively, such capabilities may also be included in the configuration file in the form of declarative statements that specify the one or more pre-requisite capabilities. It is appreciated that the one or more pre-requisite capabilities may be explicitly declared or be implicit in nature.

Upon parsing the configuration file to identify the one or more capabilities, the process moves to 520. In 520, the capability aware proxy server that is included in the test environment is configured with a set of rules based on the capabilities identified in 515. Specifically, the capability aware proxy server is programmed with a set of pre-requisite capabilities that are required to execute the release of the flock configuration. Thereafter, in 525, the release of the flock configuration is executed in the test environment. It is appreciated that a release of flock configuration may correspond to artifacts of the flock (e.g., code being deployed to an infrastructure component or a Kubernetes engine cluster) that are to be tested in the test environment. Referring to FIG. 4, it is noted that the flock release may be executed by application hosts and containers that are provisioned in the test environment by a worker.

Thereafter, the process moves to 530, where the capability aware proxy server determines whether the release of the flock configuration is successfully executed. It is noted that the capability aware proxy server may perform such a determination based on its configuration that is dependent on the set of one or more capabilities identified in 515. In other words, the capability aware proxy server determines whether the flock is/can be executed in a successful manner i.e., abides with the given set of capabilities (explicit or implicit capabilities) programmed for the capability aware proxy server. In some implementations, in 535, a query is executed to determine whether execution of the release of the flock is successful. If the response to the query is negative, the process moves to 540, else, if the response to the query is affirmative, then the process moves to 545.

At 540 (i.e., in response to an unsuccessful determination in 535), the capability aware proxy server generates (and transmits) a message indicating an execution failure of the release of the flock configuration to the CIOS regional. Additionally, the capability aware proxy server is also configured to generate (and transmit to the CIOS regional) a transcript (e.g., a transaction log) including one or more events that occurred during an execution of the release of the configuration file of the service in the test environment. Referring to FIG. 4, it is noted that such a transcript received by the CIOS regional, may further be transmitted to the CIOS central for further analysis of the flock configuration to be performed for example by authorized personnel e.g., a system administrator. It is noted that the execution of the release of the flock configuration file may be unsuccessful, in one scenario, as follows: the capability aware proxy server is programmed, for example, with capabilities 'A' and 'B' as being the required pre-requisite capabilities for execution of release of the flock configuration. However, upon execution of the flock release (e.g., code being executed in the application host of the test environment), it is observed that another capability (e.g., capability 'C' for which the capability aware proxy is not configured) is required for the execution of the flock configuration.

At 545 (i.e., in response to a successful determination in 535), the capability aware proxy server generates (and transmits the CIOS regional), a message indicating a successful execution of the release of the flock configuration. Additionally, the capability aware proxy server may also be configured to generate (and transmit to the CIOS regional) a transcript (e.g., a transaction log) including one or more events that occurred during an execution of the release of the configuration file of the service in the test environment. It is noted that a successful execution of the flock release corresponds to a scenario where the execution of the flock release abides with the given set of capabilities (explicit or implicit capabilities) programmed in the capability aware proxy. Additionally, in some implementations, upon determining that a release of the flock configuration was executed successfully in the test environment, a deployment message may be transmitted (e.g., from the capability aware proxy server to CIOS central), where the message indicates that the flock was executed successfully and is ready for deployment in a target region (e.g., target region 114, or ViBE 116 of FIG. 1). In this manner, utilizing the test environment 450 of FIG. 4, one may test a release of a flock configuration in a time-efficient and seamless manner, without having to test the flock in a real built region.

FIG. 5B depicts an exemplary log/transcript generated by a capability aware proxy server, according to at least one embodiment. Specifically, FIG. 5B depicts portions of a transcript/log that is generated by the capability aware proxy server in the execution of a single test run of a release of a flock configuration in the test environment. As shown in FIG. 5B, the portions of the transcripts 560 and 570 include a series of time-stamped events. For instance, portion of the log 560 includes a timestamped event 561, which indicates a failure incurred by the worker in the execution of the release of the flock configuration. A status of the failure is indicated, for instance, by a 404 error (labeled 565) that corresponds to the message 562 that indicates that the failure occurred due to inability of the worker to access a particular resource type. Portion 570 of the log also includes a series of time-stamped events which indicate a failure of the region being tested.

Referring to FIG. 4, it is appreciated that in some implementations, the capability aware proxy server is configured to generate a transcript including one or more events that occur during an execution of the release of the configuration file of the service in the test environment. Such a transcript may be transmitted by the capability aware proxy server to the regional cloud infrastructure orchestration system (CIOS) that is deployed outside the test environment. In some implementations, while the capability aware proxy server is configured to generate the transcript (i.e., a log including detailed information related to events that transpire in the execution of the release configuration), the worker may also be configured to transmit messages indicating a status of the execution of the release configuration to the CIOS regional module that is deployed outside the test environment.

Example Cloud Service Infrastructure Architecture

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact)

can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
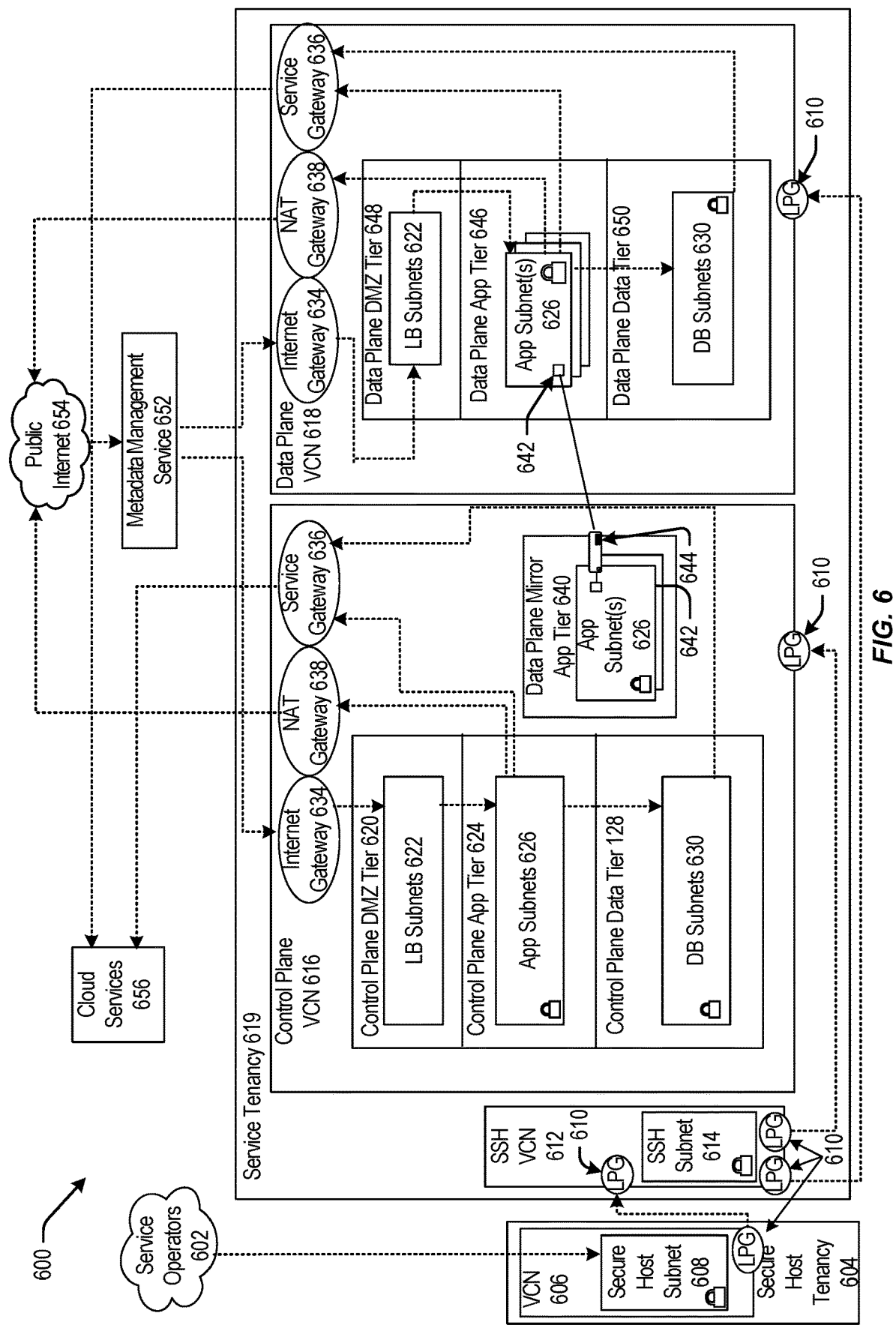
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of threat prevention, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
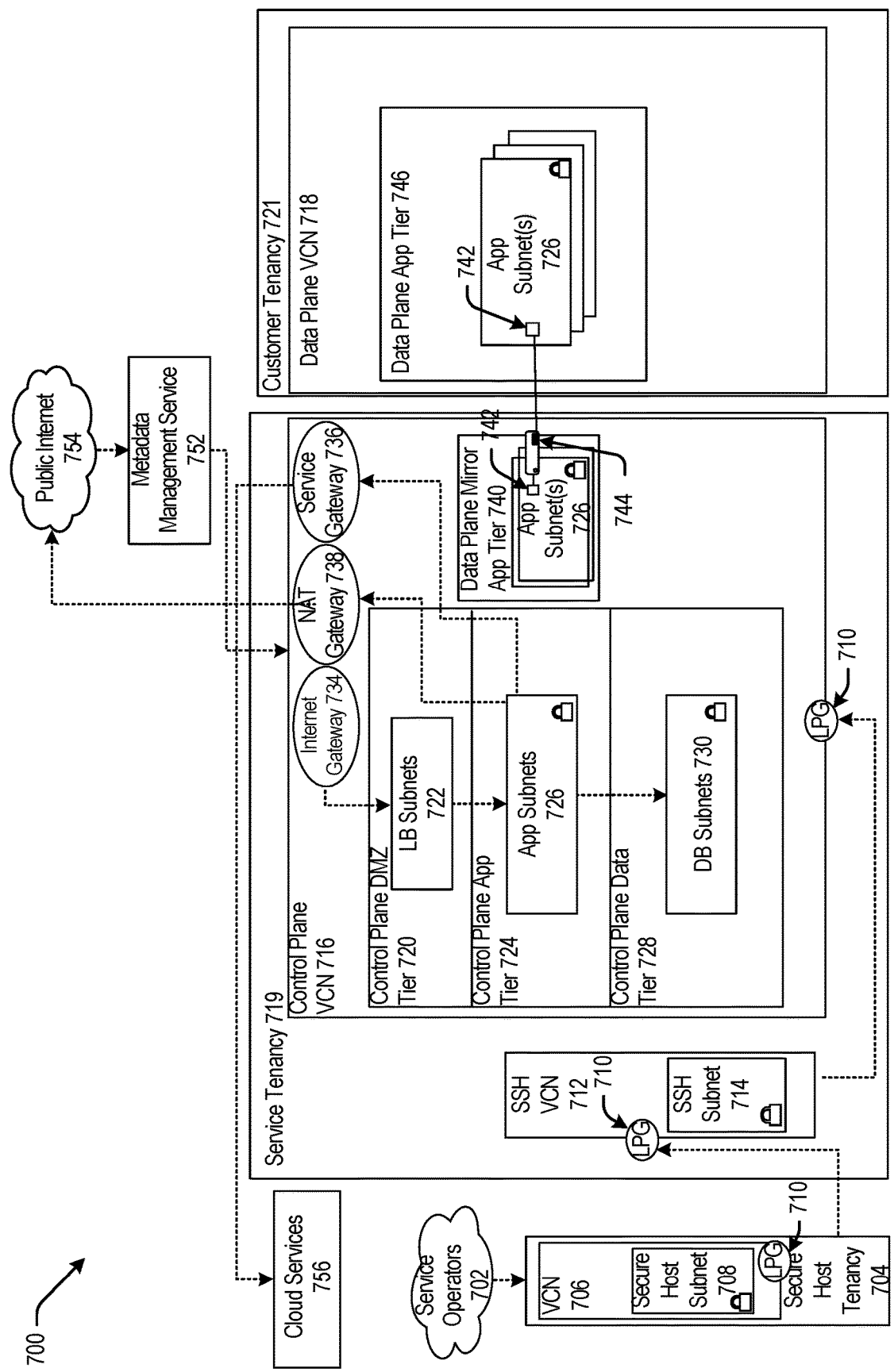
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g., service operators 602 of FIG. 6) can be communicatively coupled to a secure host tenancy 704 (e.g., the secure host tenancy 604 of FIG. 6) that can include a virtual cloud network (VCN) 706 (e.g., the VCN 606 of FIG. 6) and a secure host subnet 708 (e.g., the secure host subnet 608 of FIG. 6). The VCN 706 can include a local peering gateway (LPG) 710 (e.g., the LPG 610 of FIG. 6) that can be communicatively coupled to a secure shell (SSH) VCN 712 (e.g., the SSH VCN 612 of FIG. 6) via an LPG 610 contained in the SSH VCN 712. The SSH VCN 712 can include an SSH subnet 714 (e.g., the SSH subnet 614 of FIG. 6), and the SSH VCN 712 can be communicatively coupled to a control plane VCN 716 (e.g., the control plane VCN 616 of FIG. 6) via an LPG 710 contained in the control plane VCN 716. The control plane VCN 716 can be contained in a service tenancy 719 (e.g., the service tenancy 619 of FIG. 6), and the data plane VCN 718 (e.g., the data plane VCN 618 of FIG. 6) can be contained in a customer tenancy 721 that may be owned or operated by users, or customers, of the system.

The control plane VCN 716 can include a control plane DMZ tier 720 (e.g., the control plane DMZ tier 620 of FIG. 6) that can include LB subnet(s) 722 (e.g., LB subnet(s) 622 of FIG. 6), a control plane app tier 724 (e.g., the control plane app tier 624 of FIG. 6) that can include app subnet(s) 726 (e.g., app subnet(s) 626 of FIG. 6), a control plane data tier 728 (e.g., the control plane data tier 628 of FIG. 6) that can include database (DB) subnet(s) 730 (e.g., similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g., the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g., the service gateway 636 of FIG. 6) and a network address translation (NAT) gateway 738 (e.g., the NAT gateway 638 of FIG. 6). The control plane VCN 716 can include the service gateway 736 and the NAT gateway 738.

The control plane VCN 716 can include a data plane mirror app tier 740 (e.g., the data plane mirror app tier 640 of FIG. 6) that can include app subnet(s) 726. The app subnet(s) 726 contained in the data plane mirror app tier 740 can include a virtual network interface controller (VNIC) 742 (e.g., the VNIC of 642) that can execute a compute instance 744 (e.g., similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g., the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g., the metadata management service 652 of FIG. 6) that can be communicatively coupled to public Internet 754 (e.g., public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g., cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service deployment 756 may be located in Region 1 and in "Region 2." If a call to deployment is made by the service gateway 736 contained in the control plane VCN 716 located in Region 1, the call may be transmitted to Deployment in Region 1. In this example, the control plane VCN 716, or Deployment in Region 1, may not be communicatively coupled to, or otherwise in communication with, Deployment in Region 2.

Figure 8:
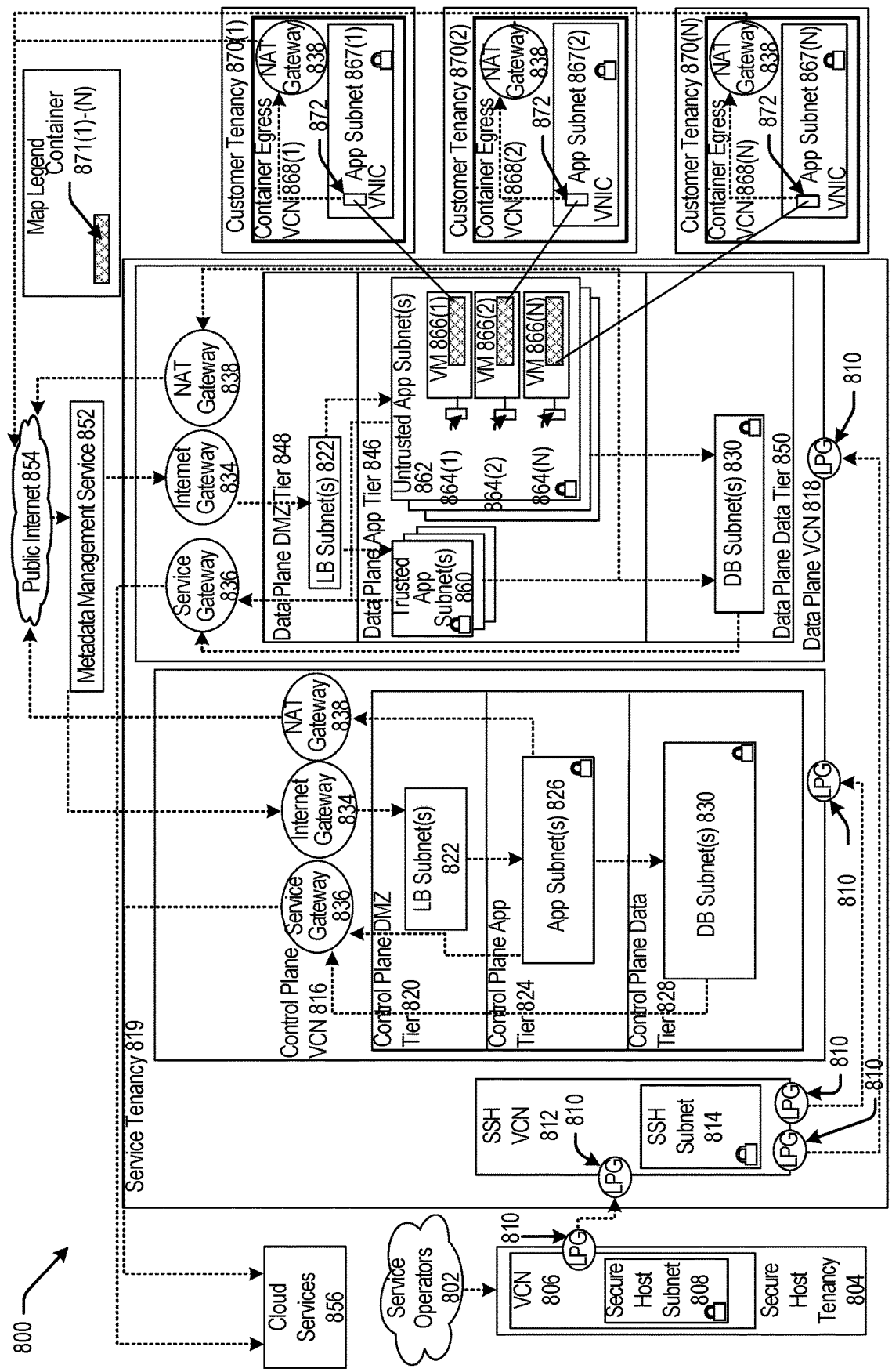
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g., service operators 602 of FIG. 6) can be communicatively coupled to a secure host tenancy 804 (e.g., the secure host tenancy 604 of FIG. 6) that can include a virtual cloud network (VCN) 806 (e.g., the VCN 606 of FIG. 6) and a secure host subnet 808 (e.g., the secure host subnet 608 of FIG. 6). The VCN 806 can include an LPG 810 (e.g., the LPG 610 of FIG. 6) that can be communicatively coupled to an SSH VCN 812 (e.g., the SSH VCN 612 of FIG. 6) via an LPG 810 contained in the SSH VCN 812. The SSH VCN 812 can include an SSH subnet 814 (e.g., the SSH subnet 614 of FIG. 6), and the SSH VCN 812 can be communicatively coupled to a control plane VCN 816 (e.g., the control plane VCN 616 of FIG. 6) via an LPG 810 contained in the control plane VCN 816 and to a data plane VCN 818 (e.g., the data plane 618 of FIG. 6) via an LPG 810 contained in the data plane VCN 818. The control plane VCN 816 and the data plane VCN 818 can be contained in a service tenancy 819 (e.g., the service tenancy 619 of FIG. 6).

The control plane VCN 816 can include a control plane DMZ tier 820 (e.g., the control plane DMZ tier 620 of FIG. 6) that can include load balancer (LB) subnet(s) 822 (e.g., LB subnet(s) 622 of FIG. 6), a control plane app tier 824 (e.g., the control plane app tier 624 of FIG. 6) that can include app subnet(s) 826 (e.g., similar to app subnet(s) 626 of FIG. 6), a control plane data tier 828 (e.g., the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g., the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g., the service gateway of FIG. 6) and a network address translation (NAT) gateway 838 (e.g., the NAT gateway 638 of FIG. 6). The control plane VCN 816 can include the service gateway 836 and the NAT gateway 838.

The data plane VCN 818 can include a data plane app tier 846 (e.g., the data plane app tier 646 of FIG. 6), a data plane DMZ tier 848 (e.g., the data plane DMZ tier 648 of FIG. 6), and a data plane data tier 850 (e.g., the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g., public Internet 654 of FIG. 6).

The Internet gateway 834 contained in the control plane VCN 816 and contained in the data plane VCN 818 can be communicatively coupled to a metadata management service 852 (e.g., the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
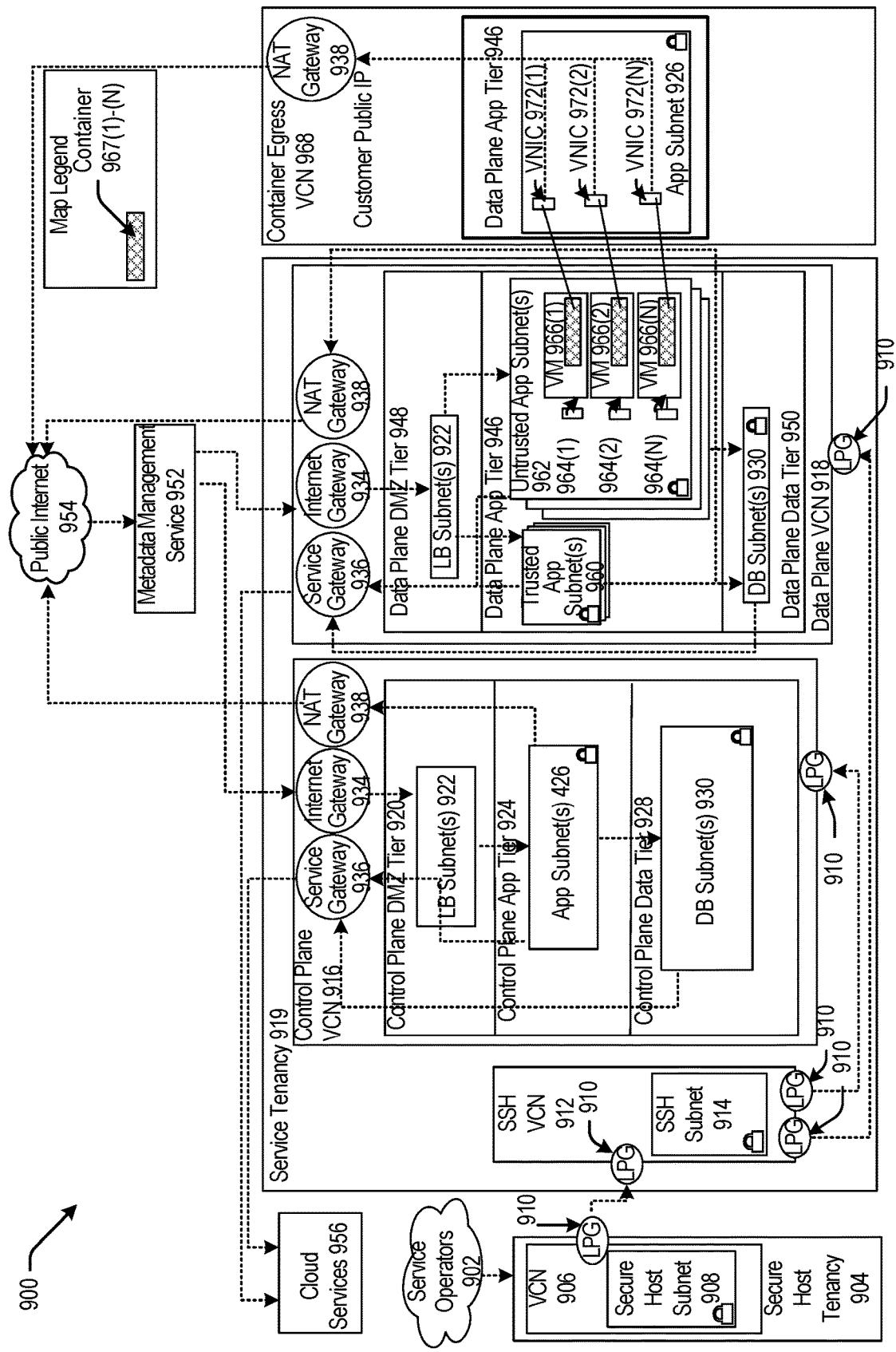
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 602 of FIG. 6) can be communicatively coupled to a secure host tenancy 904 (e.g., the secure host tenancy 604 of FIG. 6) that can include a virtual cloud network (VCN) 906 (e.g., the VCN 606 of FIG. 6) and a secure host subnet 908 (e.g., the secure host subnet 608 of FIG. 6). The VCN 906 can include an LPG 910 (e.g., the LPG 610 of FIG. 6) that can be communicatively coupled to an SSH VCN 912 (e.g., the SSH VCN 612 of FIG. 6) via an LPG 910 contained in the SSH VCN 912. The SSH VCN 912 can include an SSH subnet 914 (e.g., the SSH subnet 614 of FIG. 6), and the SSH VCN 912 can be communicatively coupled to a control plane VCN 916 (e.g., the control plane VCN 616 of FIG. 6) via an LPG 910 contained in the control plane VCN 916 and to a data plane VCN 918 (e.g., the data plane 618 of FIG. 6) via an LPG 910 contained in the data plane VCN 918. The control plane VCN 916 and the data plane VCN 918 can be contained in a service tenancy 919 (e.g., the service tenancy 619 of FIG. 6).

The control plane VCN 916 can include a control plane DMZ tier 920 (e.g., the control plane DMZ tier 620 of FIG. 6) that can include LB subnet(s) 922 (e.g., LB subnet(s) 622 of FIG. 6), a control plane app tier 924 (e.g., the control plane app tier 624 of FIG. 6) that can include app subnet(s) 926 (e.g., app subnet(s) 626 of FIG. 6), a control plane data tier 928 (e.g., the control plane data tier 628 of FIG. 6) that can include DB subnet(s) 930 (e.g., DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g., the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g., the service gateway of FIG. 6) and a network address translation (NAT) gateway 938 (e.g., the NAT gateway 638 of FIG. 6). The control plane VCN 916 can include the service gateway 936 and the NAT gateway 938.

The data plane VCN 918 can include a data plane app tier 946 (e.g., the data plane app tier 646 of FIG. 6), a data plane DMZ tier 948 (e.g., the data plane DMZ tier 648 of FIG. 6), and a data plane data tier 950 (e.g., the data plane data tier 650 of FIG. 6). The data plane DMZ tier 948 can include LB subnet(s) 922 that can be communicatively coupled to trusted app subnet(s) 960 (e.g., trusted app subnet(s) 860 of FIG. 8) and untrusted app subnet(s) 962 (e.g., untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g., public Internet 654 of FIG. 6).

The Internet gateway 934 contained in the control plane VCN 916 and contained in the data plane VCN 918 can be communicatively coupled to a metadata management service 952 (e.g., the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
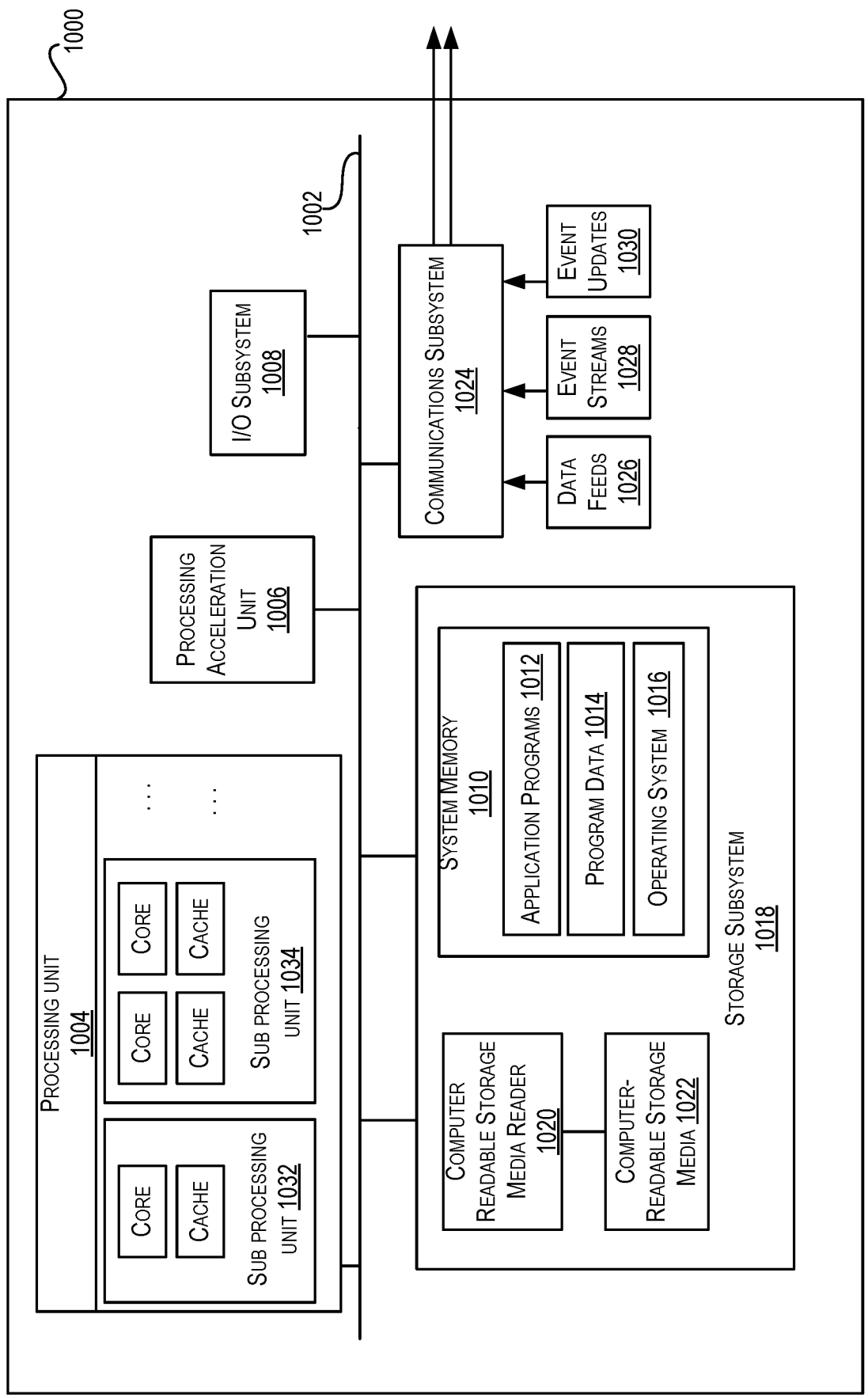
FIG. 10 is a block diagram illustrating an example computer system, according to at least one embodiment.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1004 provide the functionality described above. Storage subsystem 1018 may also provide a repository for storing data used in accordance with the present disclosure.

As depicted in the example in FIG. 10, storage subsystem 1018 can include various components including a system memory 1010, computer-readable storage media 1022, and a computer readable storage media reader 1020. System memory 1010 may store program instructions that are loadable and executable by processing unit 1004. System memory 1010 may also store data that is used during the execution of the instructions and/or data that is generated during the execution of the program instructions. Various different kinds of programs may be loaded into system memory 1010 including but not limited to client applications, Web browsers, mid-tier applications, relational database management systems (RDBMS), virtual machines, containers, etc.

System memory 1010 may also store an operating system 1016. Examples of operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1000 executes one or more virtual machines, the virtual machines along with their guest operating systems (GOSs) may be loaded into system memory 1010 and executed by one or more processors or cores of processing unit 1004.

System memory 1010 can come in different configurations depending upon the type of computer system 1000. For example, system memory 1010 may be volatile memory (such as random-access memory (RAM)) and/or non-volatile memory (such as read-only memory (ROM), flash memory, etc.) Different types of RAM configurations may be provided including a static random-access memory (SRAM), a dynamic random-access memory (DRAM), and others. In some implementations, system memory 1010 may include a basic input/output system (BIOS) containing basic routines that help to transfer information between elements within computer system 1000, such as during start-up.

Computer-readable storage media 1022 may represent remote, local, fixed, and/or removable storage devices plus storage media for temporarily and/or more permanently containing, storing, computer-readable information for use by computer system 1000 including instructions executable by processing unit 1004 of computer system 1000.

Computer-readable storage media 1022 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid-state RAM, dynamic RAM, static RAM, DRAM-based SSDs, magneto-resistive RAM (MRAM) SSDs, and hybrid SSDs that use a combination of DRAM and flash memory-based SSDs. The disk drives and their associated computer-readable media may provide non-volatile storage of computer-readable instructions, data structures, program modules, and other data for computer system 1000.

Machine-readable instructions executable by one or more processors or cores of processing unit 1004 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
    parsing a configuration file of a service to identify one or more capabilities for executing a test release of the configuration file of the service, wherein the one or more capabilities correspond to operations performed with respect to one or more resource types;
    providing a test environment for executing the test release of the configuration file of the service, the test environment being different than a real region of a cloud infrastructure;
    configuring a capability-aware-proxy server included in the test environment, by an orchestrator deployed outside the test environment, the configuring being based on the one or more capabilities identified from the configuration file of the service, the capability-aware-proxy server communicatively coupling the test environment and the real region of the cloud infrastructure;
    executing, in the test environment, the test release of the configuration file of the service wherein the capability-aware-proxy server provides to an application host provisioned in the test environment, access to at least some resource types deployed in the real region of the cloud infrastructure for executing the test release of the configuration file of the service; and
    generating a response message corresponding to an execution result of the test release of the configuration file of the service.

2. The method of claim 1, wherein the test environment includes a worker that is configured to provision at least one of an application host and a container in the test environment for executing the test release of the configuration file of the service.

3. The method of claim 1, further comprising:
    generating a transcript including one or more events that occur during an execution of the test release of the configuration file of the service in the test environment.

4. The method of claim 1, wherein the response message is transmitted by the capability-aware-proxy server to a regional cloud infrastructure orchestration system (CIOS) that is deployed outside the test environment.

5. The method of claim 1, wherein executing the test release of the configuration file of the service further comprises:
    determining whether the test release of the configuration file of the service is executed successfully; and
    identifying, in response to an unsuccessful execution, at least one capability for which the capability-aware-proxy server is not configured but required for executing the test release of the configuration file of the service.

6. The method of claim 1, further comprising:
    providing, by the capability-aware-proxy server, access to at least one resource type that is deployed in the real region and required for executing the test release of the configuration file of the service.

7. The method of claim 1, wherein the operations performed with respect to the one or more resource types include at least one of
    creating keys,
    deploying one or more data objects, or
    publishing permission policies related to access of the one or more resource types.

8. The method of claim 1, wherein configuring the capability-aware-proxy server included in the test environment further comprises:
    setting a rule for the capability-aware-proxy server based on the one or more capabilities identified from the configuration file, wherein the rule identifies one or more operations that are permitted for executing the test release of the configuration file of the service.

9. One or more computer readable non-transitory media storing computer-executable instructions that, when executed by one or more processors, cause:

parsing a configuration file of a service to identify one or more capabilities for executing a test release of the configuration file of the service, wherein the one or more capabilities correspond to operations performed with respect to one or more resource types;

providing a test environment for executing the test release of the configuration file of the service, the test environment being different than a real region of a cloud infrastructure;

configuring a capability-aware-proxy server included in the test environment, by an orchestrator deployed outside the test environment, the configuring being based on the one or more capabilities identified from the configuration file of the service, the capability-aware-proxy server communicatively coupling the test environment and the real region of the cloud infrastructure;

executing, in the test environment, the test release of the configuration file of the service wherein the capability-aware-proxy server provides to an application host provisioned in the test environment, access to at least some resource types deployed in the real region of the cloud infrastructure for executing the test release of the configuration file of the service; and generating a response message corresponding to an execution result of the test release of the configuration file of the service.

10. The one or more computer readable non-transitory media storing computer-executable instructions of claim 9, wherein the test environment includes a worker that is configured to provision at least one of an application host and a container in the test environment for executing the test release of the configuration file of the service.

11. The one or more computer readable non-transitory media storing computer-executable instructions of claim 9, further comprising instructions that, when executed by one or more processors, cause:
generating a transcript including one or more events that occur during an execution of the test release of the configuration file of the service in the test environment.

12. The one or more computer readable non-transitory media storing computer-executable instructions of claim 9, wherein the response message is transmitted by the capability-aware-proxy server to a regional cloud infrastructure orchestration system (CIOS) that is deployed outside the test environment.

13. The one or more computer readable non-transitory media storing computer-executable instructions of claim 9, further comprising instructions that, when executed by one or more processors, cause:
determining whether the test release of the configuration file of the service is executed successfully; and
identifying, in response to an unsuccessful execution, at least one capability for which the capability-aware-proxy server is not configured but required for executing the test release of the configuration file of the service.

14. The one or more computer readable non-transitory media storing computer-executable instructions of claim 9, further comprising instructions that, when executed by one or more processors, cause:

providing, by the capability-aware-proxy server, access to at least one resource type that is deployed in the real region and required for executing the test release of the configuration file of the service.

15. The one or more computer readable non-transitory media storing computer-executable instructions of claim 9, wherein the operations performed with respect to the one or more resource types include at least one of
creating keys,
deploying one or more data objects, or
publishing permission policies related to access of the one or more resource types.

16. A system comprising:
one or more processors; and
a memory including instructions that, when executed with the one or more processors, cause the system to:
parse a configuration file of a service to identify one or more capabilities for executing a test release of the configuration file of the service, wherein the one or more capabilities correspond to operations performed with respect to one or more resource types;
provide a test environment for executing the test release of the configuration file of the service, the test environment being different than a real region of a cloud infrastructure;
configure a capability-aware-proxy server included in the test environment, by an orchestrator deployed outside the test environment, the capability-aware-proxy server being configured based on the one or more capabilities identified from the configuration file of the service, the capability-aware-proxy server communicatively coupling the test environment and the real region of the cloud infrastructure;
execute, in the test environment, the test release of the configuration file of the service wherein the capability-aware-proxy server provides to an application host provisioned in the test environment, access to at least some resource types deployed in the real region of the cloud infrastructure for executing the test release of the configuration file of the service; and
generate a response message corresponding to an execution result of the test release of the configuration file of the service.

17. The system of claim 16, wherein the test environment includes a worker that is configured to provision at least one of an application host and a container in the test environment for executing the test release of the configuration file of the service.

18. The system of claim 16, wherein the one or more processors are further configured to cause the system to:
generate a transcript including one or more events that occur during an execution of the test release of the configuration file of the service in the test environment.

19. The system of claim 16, wherein the response message is transmitted by the capability-aware-proxy server to a regional cloud infrastructure orchestration system (CIOS) that is deployed outside the test environment.

* * * * *